(12) United States Patent
Chen

(10) Patent No.: US 10,770,916 B2
(45) Date of Patent: Sep. 8, 2020

(54) TWO-LEVEL LED SECURITY LIGHT WITH MOTION SENSOR

(71) Applicant: VAXCEL INTERNATIONAL CO., LTD., Carol Stream, IL (US)

(72) Inventor: Chia-Teh Chen, Taipei (TW)

(73) Assignee: Vaxcel International Co., Ltd., Carl Stream, IL (US)

( * ) Notice: Subject to any disclaimer, the term of this patent is extended or adjusted under 35 U.S.C. 154(b) by 0 days.

(21) Appl. No.: 16/668,599

(22) Filed: Oct. 30, 2019

(65) Prior Publication Data

US 2020/0067343 A1 Feb. 27, 2020

Related U.S. Application Data

(60) Continuation of application No. 16/244,671, filed on Jan. 10, 2019, now Pat. No. 10,516,292, which is a (Continued)

(51) Int. Cl.
*H05B 37/02* (2006.01)
*H02J 7/35* (2006.01)
(Continued)

(52) U.S. Cl.
CPC .................. *H02J 7/35* (2013.01); *F21S 9/03* (2013.01); *F21V 17/02* (2013.01); *G08B 5/36* (2013.01); *G08B 13/1895* (2013.01); *G08B 15/00* (2013.01); *G08B 15/002* (2013.01); *H05B 39/042* (2013.01); *H05B 39/044* (2013.01); *H05B 45/10* (2020.01); *H05B 45/14* (2020.01); *H05B 45/20* (2020.01); *H05B 45/37* (2020.01); *H05B 45/44* (2020.01); *H05B 45/46* (2020.01); *H05B 45/48* (2020.01); *H05B 47/10* (2020.01); *H05B 47/105* (2020.01); *H05B 47/11* (2020.01); *H05B 47/16* (2020.01);
(Continued)

(58) Field of Classification Search
CPC ............ H05B 33/0815; H05B 33/0824; H05B 33/083; H05B 33/0845; H05B 33/0854; H05B 33/0872; H05B 37/0218; H05B 37/0227; H05B 37/0281; H05B 37/0272
USPC ................ 315/149, 152, 154, 307, 308, 312
See application file for complete search history.

(56) References Cited

U.S. PATENT DOCUMENTS 5,134,387 A 7/1992 Smith et al.
5,598,066 A 1/1997 Wiesemann et al.
(Continued)

*Primary Examiner* — Tung X Le
(74) *Attorney, Agent, or Firm* — Rosenberg, Klein & Lee

(57) ABSTRACT

A method of configuring an LED light with a tunable diffused light color temperature is disclosed. The method comprises using a light-emitting unit configured with a first LED load emitting light with a low color temperature and a second LED load emitting light with a high color temperature electrically connected in parallel, using a light diffuser to cover the first LED load and the second LED load to create a diffused light with a diffused light color temperature, using two semiconductor switching devices working in conjunction with a controller to respectively control a first electric power delivered to the first LED load and a second electric power delivered to the second LED load to operate a color temperature tuning and switching scheme and using a first external control device to output at least one first external control signal to activate a selection of a diffused light color temperature.

101 Claims, 18 Drawing Sheets

Related U.S. Application Data continuation of application No. 15/896,403, filed on Feb. 14, 2018, now Pat. No. 10,225,902, which is a continuation of application No. 15/785,658, filed on Oct. 17, 2017, now Pat. No. 10,326,301, which is a continuation of application No. 15/375,777, filed on Dec. 12, 2016, now Pat. No. 9,826,590, which is a continuation of application No. 14/836,000, filed on Aug. 26, 2015, now Pat. No. 9,622,325, which is a division of application No. 14/478,150, filed on Sep. 5, 2014, now Pat. No. 9,445,474, which is a continuation of application No. 13/222,090, filed on Aug. 31, 2011, now Pat. No. 8,866,392.

(51) Int. Cl.

| | | |
|---|---|---|
| *H05B 45/10* | (2020.01) | |
| *H05B 45/14* | (2020.01) | |
| *H05B 45/20* | (2020.01) | |
| *H05B 45/37* | (2020.01) | |
| *H05B 45/44* | (2020.01) | |
| *H05B 45/46* | (2020.01) | |
| *H05B 45/48* | (2020.01) | |
| *H05B 47/10* | (2020.01) | |
| *H05B 47/11* | (2020.01) | |
| *H05B 47/16* | (2020.01) | |
| *H05B 47/105* | (2020.01) | |
| *G08B 15/00* | (2006.01) | |
| *H05B 39/04* | (2006.01) | |
| *F21S 9/03* | (2006.01) | |
| *F21V 17/02* | (2006.01) | |
| *G08B 5/36* | (2006.01) | |
| *G08B 13/189* | (2006.01) | |
| *F21Y 115/10* | (2016.01) | |
| *G08B 13/00* | (2006.01) | |

(52) U.S. Cl.
CPC ............ *F21Y 2115/10* (2016.08); *G08B 13/00* (2013.01); *G08B 13/189* (2013.01); *Y02B 20/40* (2013.01); *Y02B 20/44* (2013.01); *Y02B 20/46* (2013.01)

(56) References Cited

U.S. PATENT DOCUMENTS

| | | |
|---|---|---|
| 5,747,937 A | 5/1998 | Wiesemann et al. |
| 6,016,038 A | 1/2000 | Mueller et al. |
| 6,211,626 B1 | 4/2001 | Lys et al. |
| 6,225,748 B1 | 5/2001 | Evans et al. |
| 6,548,967 B1 | 4/2003 | Dowling et al. |
| 6,888,323 B1 | 5/2005 | Null et al. |
| 6,909,239 B2 | 6/2005 | Gauna |
| 6,927,541 B2 | 8/2005 | Lee |
| 7,086,756 B2 | 8/2006 | Maxik |
| 7,088,059 B2 | 8/2006 | McKinney et al. |
| 7,122,976 B1 | 10/2006 | Null et al. |
| 7,268,497 B2 | 9/2007 | Hsieh |
| 7,344,275 B2 | 3/2008 | Allen et al. |
| 7,405,524 B2 | 7/2008 | Null et al. |
| 7,564,198 B2 | 7/2009 | Yamamoto et al. |
| 7,804,252 B2 | 9/2010 | Chen |
| 8,159,125 B2 | 4/2012 | Miao |
| 8,194,061 B2 | 6/2012 | Wang et al. |
| 8,310,163 B2 | 11/2012 | Chen |
| 8,476,836 B2 | 7/2013 | Van De Ven et al. |
| 8,598,805 B2 | 12/2013 | Tremblay et al. |
| 9,271,345 B2 | 2/2016 | Welten |
| 2005/0007025 A1 | 1/2005 | Gauna |
| 2005/0259416 A1 | 11/2005 | Gauna et al. |
| 2006/0022916 A1 | 2/2006 | Aiello |
| 2007/0182338 A1 | 8/2007 | Shteynberg et al. |
| 2008/0197783 A1 | 8/2008 | Chen |
| 2008/0252197 A1 | 10/2008 | Li et al. |
| 2010/0117543 A1* | 5/2010 | Van Der Veen ... H05B 33/0818 315/150 |
| 2010/0231133 A1* | 9/2010 | Lys .................. H05B 45/48 315/185 R |
| 2011/0025230 A1* | 2/2011 | Schulz .................. H05B 45/37 315/294 |
| 2011/0285292 A1* | 11/2011 | Mollnow ................. F21S 10/02 315/113 |
| 2012/0049760 A1* | 3/2012 | Dennis ............... H05B 33/0827 315/294 |

\* cited by examiner

| Brand | V_F Min. | V_F Max. | Product Series | Information Source |
|---|---|---|---|---|
| CREE | 2.9V | 3.3V | J Series LEDs/J Series 2835 | www.cree.com/led-components/products/j2835/jseries-2835 |
| LUMILEDS | 2.7V | 3.3V | LUXEON 2835 Line | www.lumileds.com/luxeon2835line |
| SAMSUNG | 2.9V | 3.3V | KM281BA+ | www.samsung.com/app/components/products/j2835/jseries-2835 |
| OSRAM | 2.7V | 3.3V | DURIS E/DURISR E 2835 | www.osram.com/app/product_selector/#!?query=DORIS%20E%202835&sortField=&sortOrder=&start-0&filters=productbrand,DORIS,E&filters-productbrand,DORIS |

FIG. 9

TWO-LEVEL LED SECURITY LIGHT WITH MOTION SENSOR

CROSS-REFERENCE TO RELATED APPLICATION

This is a continuation of application Ser. No. 16/244,671, filed Jan. 10, 2019. Ser. No. 16/244,671 is a continuation of application Ser. No. 15/896,403, filed Feb. 14, 2018, which issued as U.S. Pat. No. 10,225,902 on Mar. 5, 2019. U.S. Pat. No. 10,225,902 is a continuation of application Ser. No. 15/785,658, filed Oct. 17, 2017, which issued as U.S. Pat. No. 10,326,301 on Jun. 18, 2019. U.S. Pat. No. 10,326,301 is a continuation of application Ser. No. 15/375,777, filed Dec. 12, 2016, which issued as U.S. Pat. No. 9,826,590 on Nov. 21, 2017. U.S. Pat. No. 9,826,590 is a continuation of application Ser. No. 14/836,000, filed Aug. 26, 2015, which issued as U.S. Pat. No. 9,622,325 on Apr. 11, 2017. U.S. Pat. No. 9,622,325 is a divisional of application Ser. No. 14/478,150, filed Sep. 5, 2014, which issued as U.S. Pat. No. 9,445,474 on Sep. 13, 2016. U.S. Pat. No. 9,445,474 is a continuation of application Ser. No. 13/222,090, filed Aug. 31, 2011, which issued as U.S. Pat. No. 8,866,392 on Oct. 21, 2014.

BACKGROUND OF THE INVENTION

1. Technical Field

The present disclosure relates to a lighting apparatus, in particular, to a two-level security LED light with motion sensor

2. Description of Related Art

Lighting sources such as the fluorescent lamps, the incandescent lamps, the halogen lamps, and the light-emitting diodes (LED) are commonly found in lighting apparatuses for illumination purpose. Photoresistors are often utilized in outdoor lighting applications for automatic illuminations, known as the Photo-Control (PC) mode. Timers may be used in the PC mode for turning off the illumination or for switching to a lower level illumination of a lighting source after the lighting source having delivered a high level illumination for a predetermined duration, referred as the Power-Saving (PS) mode. Motion sensors are often used in the lighting apparatus for delivering full-power illumination thereof for a short duration when a human motion is detected, then switching back to the PS mode. Illumination operation controls such as auto-illumination in accordance to the background brightness detection, illumination using timer, illumination operation control using motion sensing results (e.g., dark or low luminous power to fully illuminated), and brightness control are often implemented by complex circuitries. In particular, the design and construction of LED drivers are still of a complex technology with high fabrication cost.

Therefore, how to develop a simple and effective design method on illumination controls such as enhancing contrast in illumination and color temperature for various types lighting sources, especially the controls for LEDs are the topics of the present disclosure.

SUMMARY OF THE INVENTION

An exemplary embodiment of the present disclosure provides a two-level LED security light with motion sensor which may switch to high level illumination in the Power-Saving (PS) mode for a predetermined duration time when a human motion is detected thereby achieve warning purpose using method of electric current or lighting load adjustment. Furthermore, prior to the detection of an intrusion, the LED security light may be constantly in the low level illumination to save energy.

An exemplary embodiment of the present disclosure provides a two-level LED security light including a power supply unit, a light sensing control unit, a motion sensing unit, a loading and power control unit, and a light-emitting unit. The light-emitting unit further includes one or a plurality of series-connected LEDs; when the light sensing control unit detects that the ambient light is lower than a predetermined value, the loading and power control unit turns on the light-emitting unit to generate a high level or a low level illumination; when the light sensing control unit detects that the ambient light is higher than the predetermined value, the loading and power control unit turns off the light-emitting unit; when the motion sensing unit detects a human motion in the PS mode, the loading and power control unit increases the electric current that flows through the light-emitting unit so as to generate the high level illumination for a predetermined duration.

Another exemplary embodiment of the present disclosure provides a two-level LED security light including a power supply unit, a light sensing control unit, a motion sensing unit, a loading and power control unit, a light-emitting unit. The light-emitting unit includes a plurality of series-connected LEDs. When the light sensing control unit detects that the ambient light is lower than a predetermined value, the loading and power control unit turns on a portion or all the LEDs of the light-emitting unit to generate a low level or a high level illumination; when the light sensing control unit detects that the ambient light is higher than the predetermined value, the loading and power control unit turns off all the LEDs in the light-emitting unit; when the motion sensing unit detects a human motion in the PS mode, the loading and power control unit turns on a plurality of LEDs in the light-emitting unit and generates the high level illumination for a predetermine duration. An electric current control circuit is integrated in the exemplary embodiment for providing constant electric current to drive the LEDS in the light-emitting unit.

One exemplary embodiment of the present disclosure provides a two-level LED security light including a power supply unit, a light sensing control unit, a motion sensing unit, a loading and power control unit, and a light-emitting unit. The light-emitting unit includes a phase controller and one or a plurality of parallel-connected alternating current (AC)LEDs. The phase controller is coupled between the described one or a plurality parallel-connected ACLEDs and AC power source. The loading and power control unit may through the phase controller control the average power of the light-emitting unit; when the light sensing control unit detects that the ambient light is lower than a predetermined value, the loading and power control unit turns on the light-emitting unit to generate a high level or a lower level illumination; when the light sensing control unit detects that the ambient light is higher than the predetermined value, the loading and power control unit turns off the light-emitting unit; when the motion sensing unit detects a human motion in the PS mode, the loading and power control unit increases the average power of the light-emitting unit thereby generates the high level illumination for a predetermine duration.

According to an exemplary embodiment of the present disclosure, a two-level LED security light includes a power supply unit, a light sensing control unit, a motion sensing unit, a loading and power control unit, and a light-emitting unit. The light-emitting unit includes X high wattage ACLEDs and Y low wattage ACLEDs connected in parallel. When the light sensing control unit detects that the ambient light is lower than a predetermined value, the loading and power control unit turns on the plurality of low wattage ACLEDs to generate a low level illumination; when the light sensing control unit detects that the ambient light is higher than a predetermined value, the loading and power control unit turns off the light-emitting unit; when the motion sensor detects an intrusion, the loading and power control unit turns on both the high wattage ACLEDs and the low wattage ACLEDs at same time thereby generates a high level illumination for a predetermine duration, wherein X and Y are of positive integers.

According to an exemplary embodiment of the present disclosure, a two-level LED security light with motion sensor includes a power supply unit, a light sensing control unit, a motion sensing unit, a loading and power control unit, and a light-emitting unit. The light-emitting unit includes a rectifier circuit connected between one or a plurality of parallel-connected AC lighting sources and AC power source. The loading and power control unit may through the rectifier circuit adjust the average power of the light-emitting unit. When the light sensing control unit detects that the ambient light is lower than a predetermined value, the loading and power control unit turns on the light-emitting unit to generate a low level illumination; when the light sensing control unit detects that the ambient light is higher than the predetermined value, the loading and power control unit turns off the light-emitting unit; when the motion sensing unit detects an intrusion, the loading and power control unit increases the average power of the light-emitting unit thereby generates a high level illumination for a predetermine duration. The rectifier circuit includes a switch parallel-connected with a diode, wherein the switch is controlled by the loading and power control unit.

To sum up, a two-level LED security light with motion sensor provided by an exemplary embodiment in the preset disclosure, may execute Photo-Control (PC) and Power-Saving (PS) modes. When operates in the PC mode, the lighting apparatus may auto-illuminate at night and auto-turnoff at dawn. The PC mode may generate a high level illumination for a predetermined duration then automatically switch to the PS mode by a control unit to generate a low level illumination. When the motion sensor detects a human motion, the disclosed LED security light may immediate switch to the high level illumination for a short predetermined duration thereby achieve illumination or warning effect. After the short predetermined duration, the LED security light may automatically return to the low level illumination for saving energy.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 9 is a data sheet showing data of the minimum forward voltages and maximum forward voltages collected from various LED manufacturers.

DETAILED DESCRIPTION OF PREFERRED EMBODIMENTS

Figure 1:
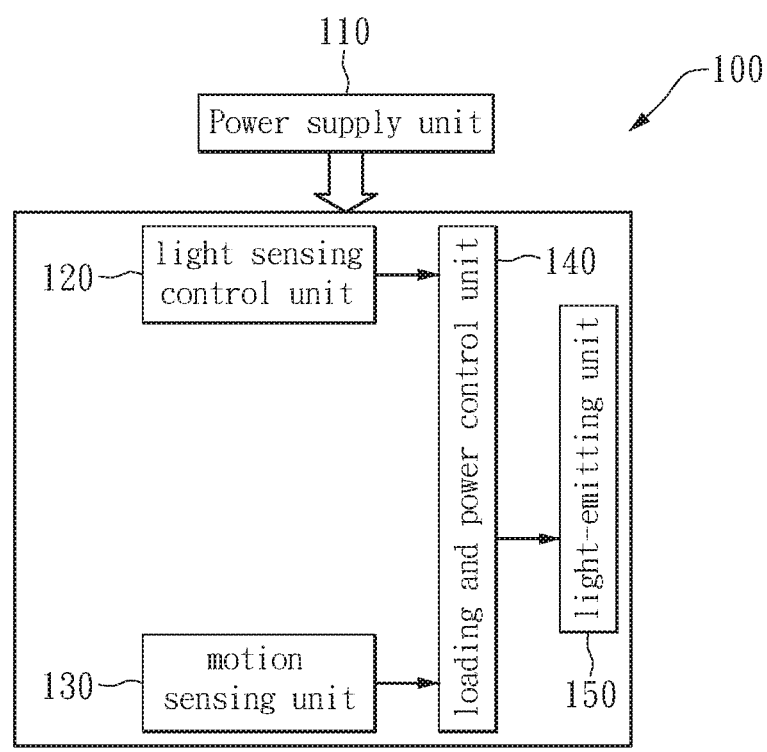
FIG. 1 schematically illustrates a block diagram of a two-level LED security light in accordance with an exemplary embodiment of the present disclosure.
Figure 1A:
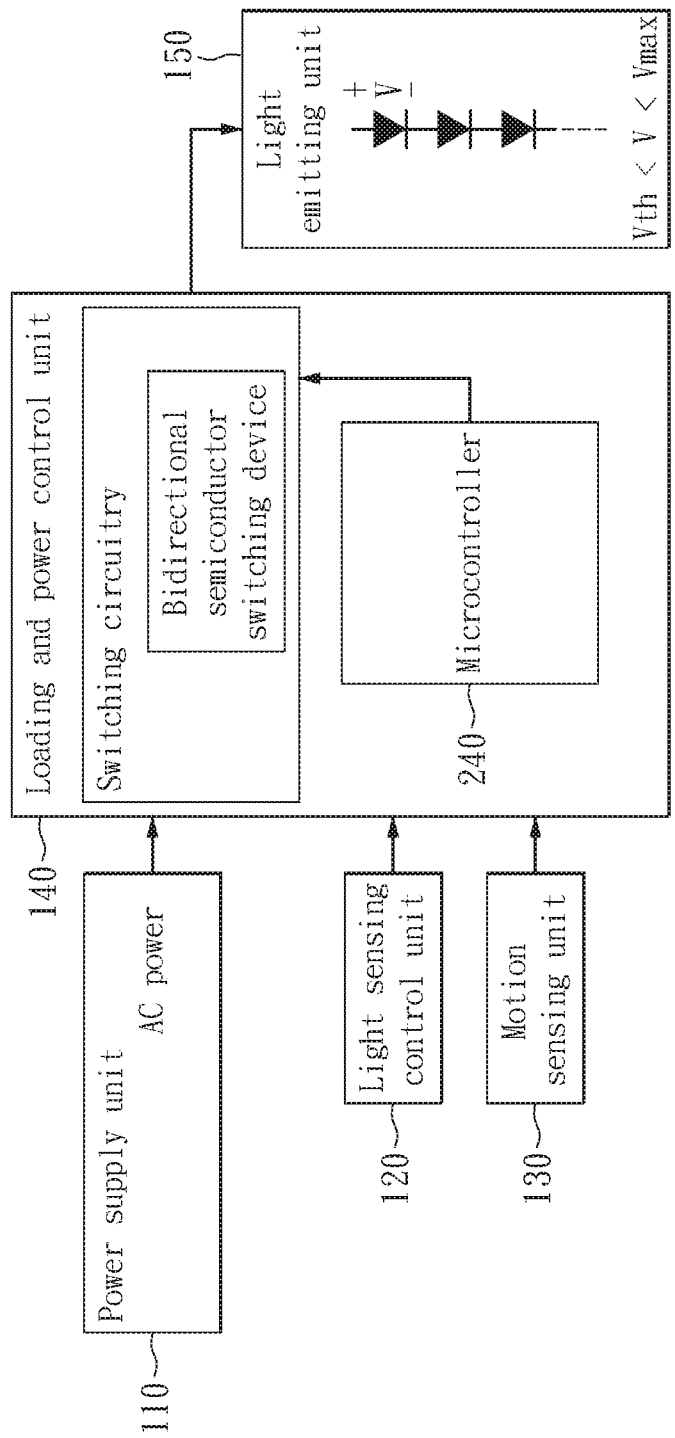
FIG. 1A is an enhanced block diagrammed under FIG. 1 to specifically illustrate an embodiment of FIG. 1 for an AC LED two-level security light, wherein the loading and power comprises a switching circuitry and a microcontroller, wherein the switching circuitry further comprises a bidirectional semiconductor switching device for controlling an average electric power to be delivered to the AC LED.
Figure 1B:
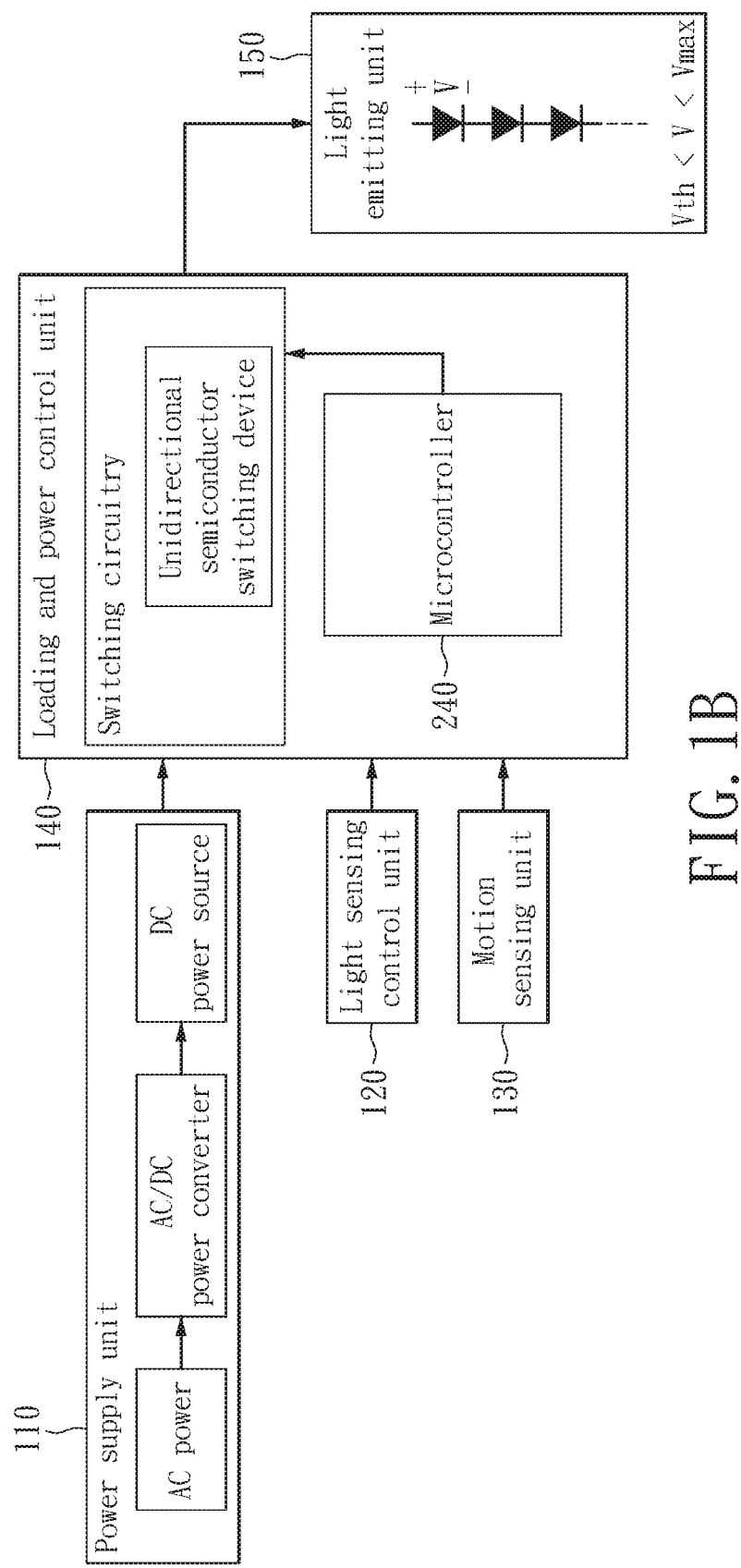
FIG. 1B is an enhanced block diagrammed under FIG. 1 to specifically illustrate an embodiment of FIG. 1 for a DC LED two-level security light, wherein the loading and power control unit comprises a switching circuitry and a microcontroller, wherein the switching circuitry further comprises an unidirectional semiconductor switching device for controlling an average electric power to be delivered to the DC LED.
Figure 1C:
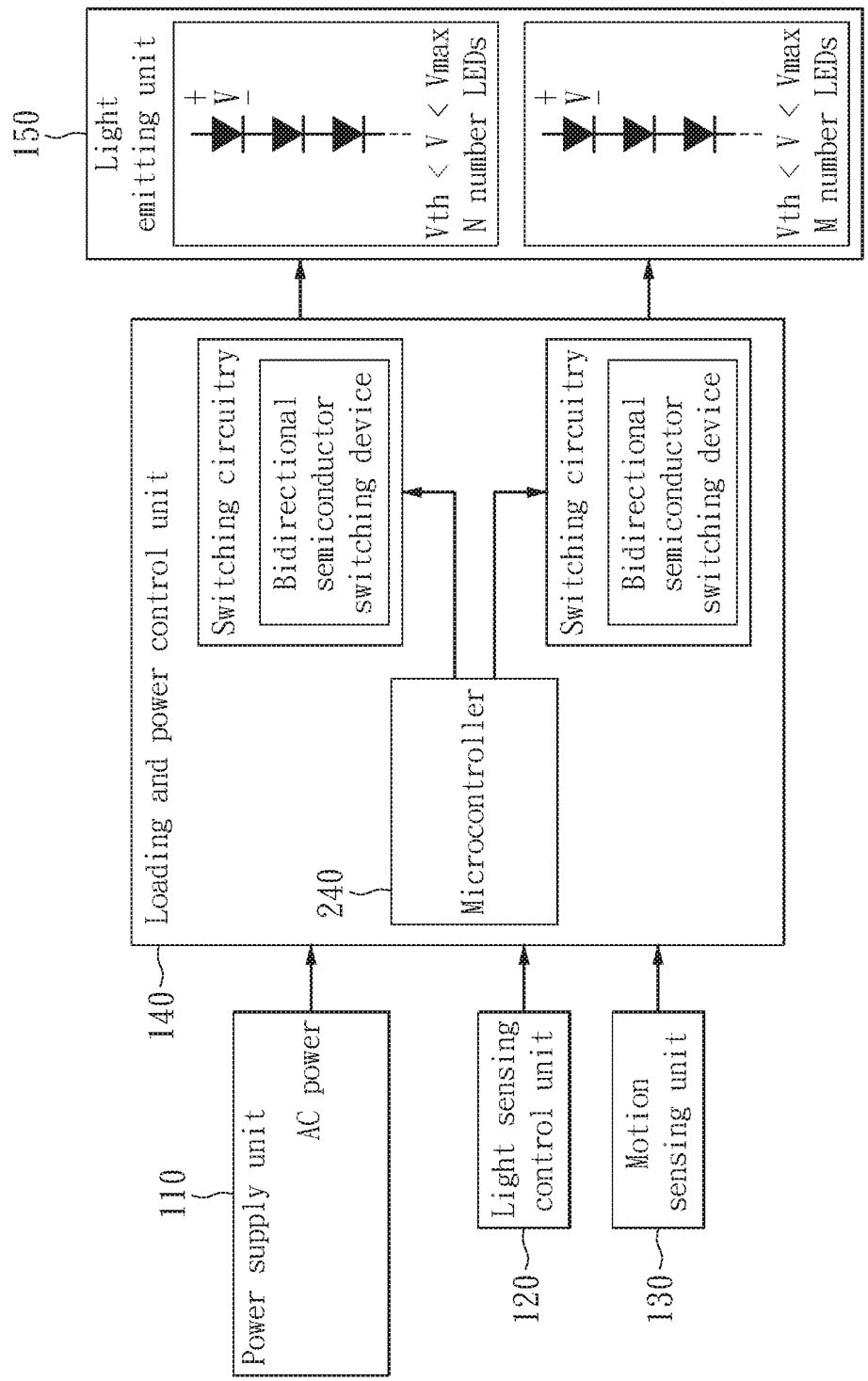
FIG. 1C is an enhanced block diagrammed under FIG. 1 to specifically illustrate an embodiment of FIG. 1 for a AC LED two-level security light including a first set having N number LEDs and a second set having M number LEDs, wherein the loading and power control unit comprises a switching circuitry and a microcontroller, wherein the switching circuitry further comprises bidirectional semiconductor switching devices for controlling an average electric power to be delivered to the AC LED.
Figure 1D:
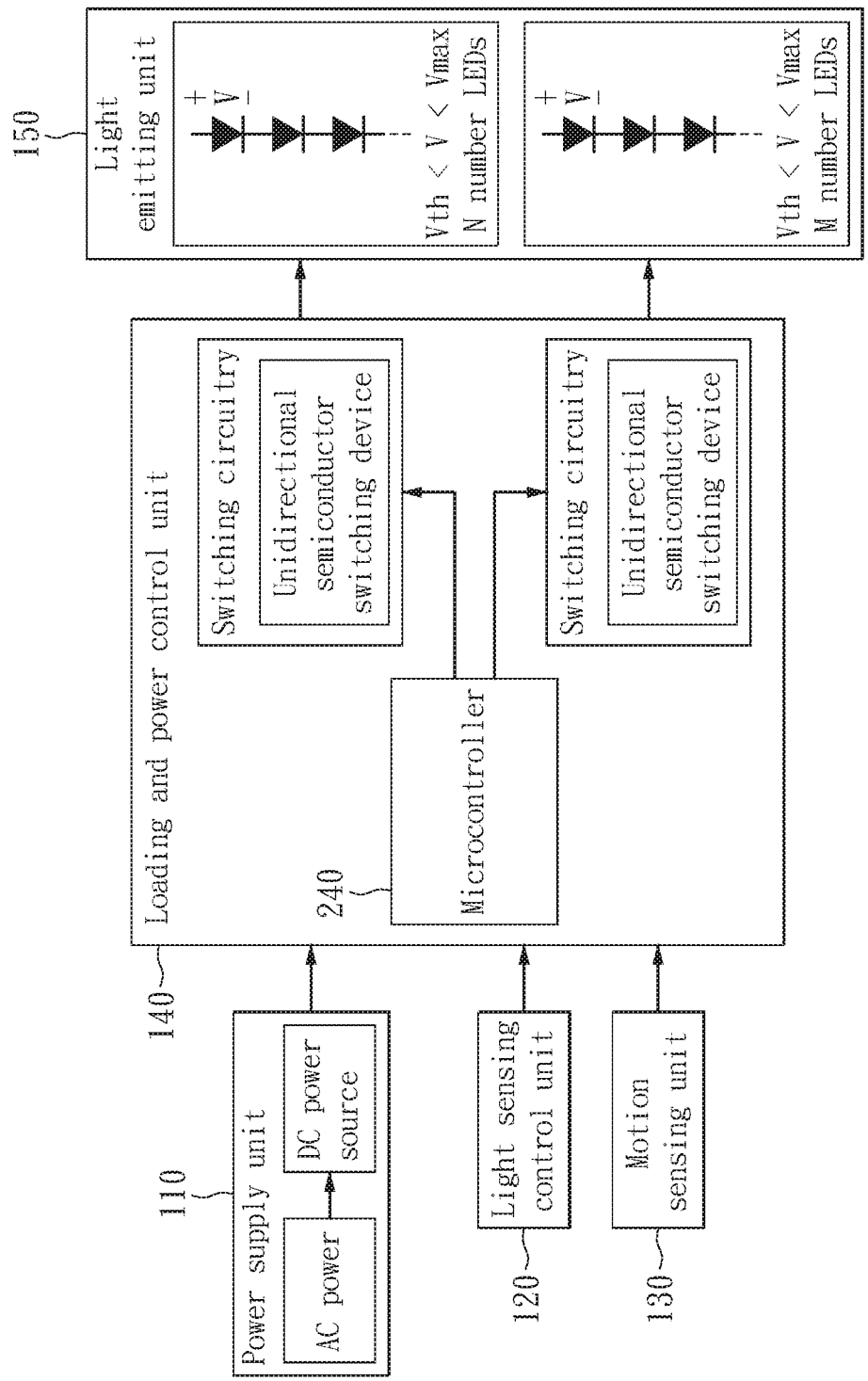
FIG. 1D is an enhanced block diagrammed under FIG. 1 to specifically illustrate an embodiment of FIG. 1 for a DC LED two-level security light including a first set having N number LEDs and a second set having M number LEDs, wherein the loading and power control unit comprises a switching circuitry and a microcontroller, wherein the switching circuitry further comprises unidirectional semiconductor switching devices for controlling an average electric power to be delivered to the DC LED.

Reference is made in detail to the exemplary embodiments of the present disclosure, examples of which are illustrated in the accompanying drawings. Wherever possible, the same reference numbers are used in the drawings and the description to refer to the same or alike parts.

First Exemplary Embodiment

Refer to FIG. 1, which schematically illustrates a block diagram of a two-level LED security light in accordance to the first exemplary embodiment of the present disclosure. A two-level LED security light (herein as the lighting apparatus) 100 includes a power supply unit 110, a light sensing control unit 120, a motion sensing unit 130, a loading and power control unit 140, and a light-emitting unit 150. The power supply unit 110 is used for supplying power required to operate the system, wherein the associated structure includes the known AC/DC voltage converter. The light sensing control unit 120 may be a photoresistor, which may be coupled to the loading and power control unit 140 for determining daytime or nighttime in accordance to the ambient light. The motion sensing unit 130 may be a passive infrared sensor (PIR), which is coupled to the loading and power control unit 140 and is used to detect intrusions. When a person is entering a predetermined detection zone of the motion sensing unit 130, a sensing signal thereof may be transmitted to the loading and power control unit 140.

The loading and power control unit 140 which is coupled to the light-emitting unit 150 may be implemented by a microcontroller. The loading and power control unit 140 may control the illumination levels of the light-emitting unit 150 in accordance to the sensing signal outputted by the light sensing control unit 120 and the motion sensing unit 130. The light-emitting unit 150 may include a plurality of LEDs and switching components. The loading and power control unit 140 may control the light-emitting unit 150 to generate at least two levels of illumination variations.

When the light sensing control unit 120 detects that the ambient light is lower than a predetermined value (i.e., nighttime), the loading and power control unit 140 executes the Photo-Control (PC) mode by turning on the light-emitting unit 150 to generate a high level illumination for a predetermined duration then return to a low level illumination for Power-Saving (PS) mode. When the light sensing control unit 120 detects that the ambient light is higher than a predetermined value (i.e., dawn), the loading and power control unit 140 turns off the light-emitting unit 150. In the PS mode, when the motion sensing unit 130 detects a human motion, the loading and power control unit 140 may increase the electric current which flow through the light-emitting unit 150, to generate the high level illumination for a short predetermined duration. After the short predetermined duration, the loading and power control unit 140 may automatically lower the electric current that flow through the light-emitting unit 150 thus have the light-emitting unit 150 return to low level illumination for saving energy.

Refer to 2A, which illustrates a schematic diagram of a two-level LED security light in accordance to the first exemplary embodiment of the present disclosure. The light sensing control unit 120 may be implemented by a light sensor 220; the motion sensing unit 130 may be implemented by a motion sensor 230; the loading and power control unit 140 may be implemented by a microcontroller 240. The light-emitting unit 250 includes three series-connected LEDs L1~L3. The LEDs L1~L3 is connected between a DC source and a transistor Q1, wherein the DC source may be provided by the power supply unit 110. The transistor Q1 may be an N-channel metal-oxide-semiconductor field-effect-transistor (NMOS). The transistor Q1 is connected between the three series-connected LEDs L1~L3 and a ground GND. The loading and power control unit 140 implemented by the microcontroller 240 may output a pulse width modulation (PWM) signal to the gate of transistor Q1 to control the average electric current. It is worth to note that the electric components depicted in FIG. 2A only serves as an illustration for the exemplary embodiment of the present disclose and hence the present disclosure is not limited thereto.

Figure 2A:
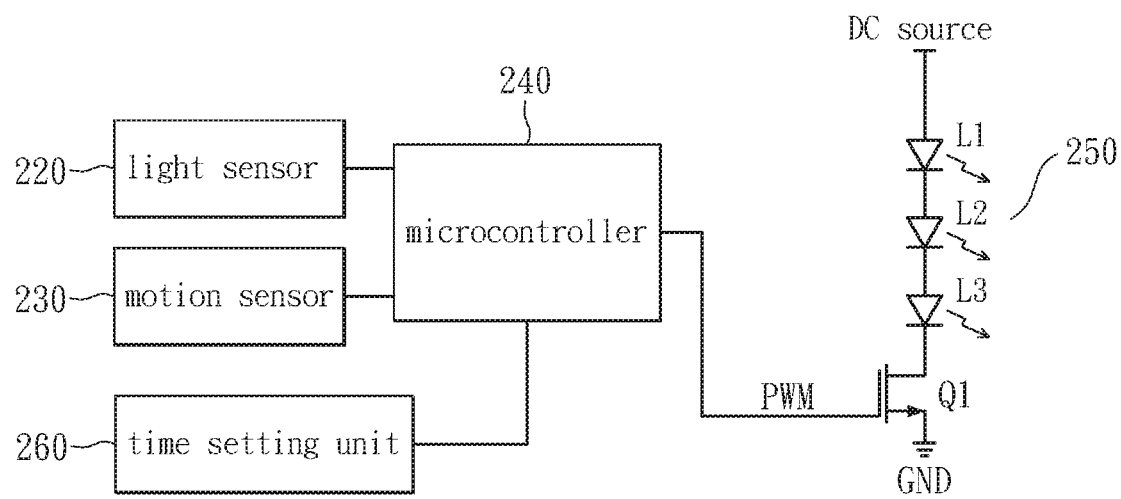
FIG. 2A illustrates a schematic diagram of a two-level LED security light in accordance to the first exemplary embodiment of the present disclosure.
Figure 2B:
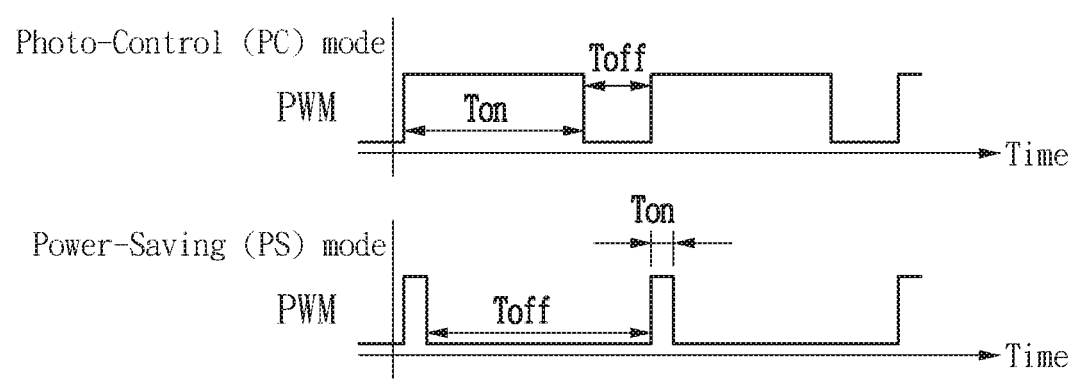
FIG. 2B graphically illustrates a timing waveform of a pulse width modulation (PWM) signal in accordance to the first exemplary embodiment of the present disclosure.

Refer to FIG. 2B concurrently, which graphically illustrates a timing waveform of a pulse width modulation (PWM) signal in accordance to the first exemplary embodiment of the present disclosure. In the PC mode, the PWM signal may be used to configure the transistor Q1 to have the conduction period $T_{on}$ being longer than the cut-off period $T_{off}$. On the other hand in the PS mode, the PWM signal may configure the transistor Q1 to have the conduction period $T_{on}$ being shorter than the cut-off period $T_{off}$. In comparison of the illumination levels between the PC and PS modes, as the conduction period $T_{on}$ of transistor Q1 being longer under the PC mode, therefore have higher average electric current driving the light-emitting unit 250 thereby generate high illumination, which may be classified as the high level illumination; whereas as the conduction period $T_{on}$ of transistor Q1 is shorter in the PS mode, therefore have lower average electric current driving the light-emitting unit 250 thereby generate low illumination, which may be classified as the low level illumination.

The microcontroller 240 turns off the light-emitting unit 250 during the day and activates the PC mode at night by turning on the light-emitting unit 250 to generate the high level illumination for a short predetermined duration then return to the low level illumination thereby entering the PS mode. When the motion sensor 230 detects a human motion in the PS mode, the light-emitting unit 250 may switch to the high level illumination for illumination or warning application. The light-emitting unit 250 may return to the low level illumination after maintaining at the high level illumination for a short predetermined duration to save energy.

In addition, the microcontroller 240 is coupled to a time setting unit 260, wherein the time setting unit 260 may allow the user to configure the predetermined duration associated with the high level illumination in the PC mode, however the present disclosure is not limited thereto. The time setting unit is a type of external control units designed to detect various external control signals and to convert the various external control signals into various message signals interpretable by the controller for setting various operating parameters of a security light including at least a time length setting for various illumination modes, a light intensity setting for various illumination modes and switching between illumination modes. The external control units may be configured with a push button, a touch sensor, a voltage divider, a power interruption detection circuitry or a wireless remote control receiver for generating message signals interpretable by the controller.

Second Exemplary Embodiment

Refer again to FIG. 1, wherein the illumination variations of the light-emitting unit 150 may be implemented through the number of light-source loads being turned on to generate more than two levels of illumination. The lighting apparatus 100 in the instant exemplary embodiment may be through turning on a portion of LEDs or all the LEDs to generate a low and a high level of illuminations.

Figure 3A:
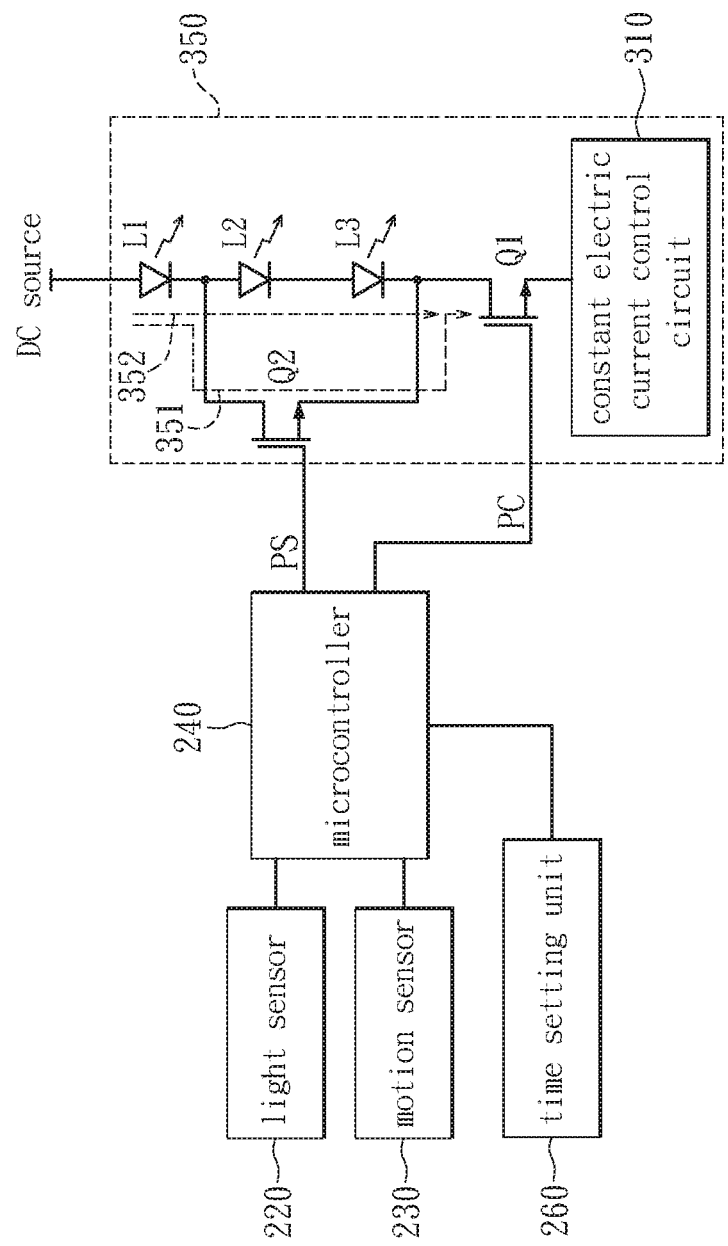
FIG. 3A illustrates a schematic diagram of a two-level LED security light in accordance to the second exemplary embodiment of the present disclosure.

Refer to FIG. 3A concurrently, which illustrates a schematic diagram of a two-level LED security light 100 in accordance to the second exemplary embodiment of the present disclosure. The main difference between FIG. 3A and FIG. 2A is in the light-emitting unit 350, having three series-connected LEDs L1~L3 and NMOS transistors Q1 and Q2. The LEDs L1~L3 are series connected to the transistor Q1 at same time connected between the DC source and a constant electric current control circuit 310. Moreover, transistor Q2 is parallel connected to the two ends associated with LEDs L2 and L3. The gates of the transistors Q1 and Q2 are connected respectively to a pin PC and a pin PS of the microcontroller 240. The constant electric current control circuit 310 in the instant exemplary embodiment maintains the electric current in the activated LED at a constant value, namely, the LEDs L1~L3 are operated in constant-current mode.

Refer to FIG. 3A, the pin PC of the microcontroller 240 controls the switching operations of the transistor Q1; when the voltage level of pin PC being either a high voltage or a low voltage, the transistor Q1 may conduct or cut-off, respectively, to turn the LEDs L1~L3 on or off. The pin PS of the microcontroller 240 controls the switch operations of the transistor Q2, to form two current paths 351 and 352 on the light-emitting unit 350. When the voltage at the pin PS of the microcontroller 240 is high, the transistor Q2 conducts, thereby forming the current path 351 passing through the LED L1 and the transistor Q2; when the voltage at the pin PS being low, the transistor Q2 cuts-off, thereby forming the current path 352 passing through all the LEDs L1~L3. The microcontroller 240 may then control the switching operation of the transistor Q2 to turn on the desired number of LEDs so as to generate a high or a low level illumination.

When light sensor 220 detects that the ambient light is higher than a predetermined value, the microcontroller 240 through the pin PC outputs a low voltage, which causes the transistor Q1 to cut-off and turns off all the LEDs L1~L3 in the light-emitting unit 350. Conversely, when the light sensor 220 detects that the ambient light is lower than the predetermined value, the microcontroller 240 activates the PC mode, i.e., outputting a high voltage from pin PC and a low voltage from pin PS, to activate the transistor Q1 while cut-off the transistor Q2, thereby forming the current path 352, to turn on the three LEDs L1~L3 in the light-emitting unit 350 so as to generate the high level illumination for a predetermined duration. After the predetermined duration, the microcontroller 240 may switch to the PS mode by having the pin PC continue outputting a high voltage and the pin PS outputting a high voltage, to have the transistor Q2 conducts, thereby forming the current path 351. Consequently, only the LED L1 is turned on and the low level illumination is generated.

Figure 3B:
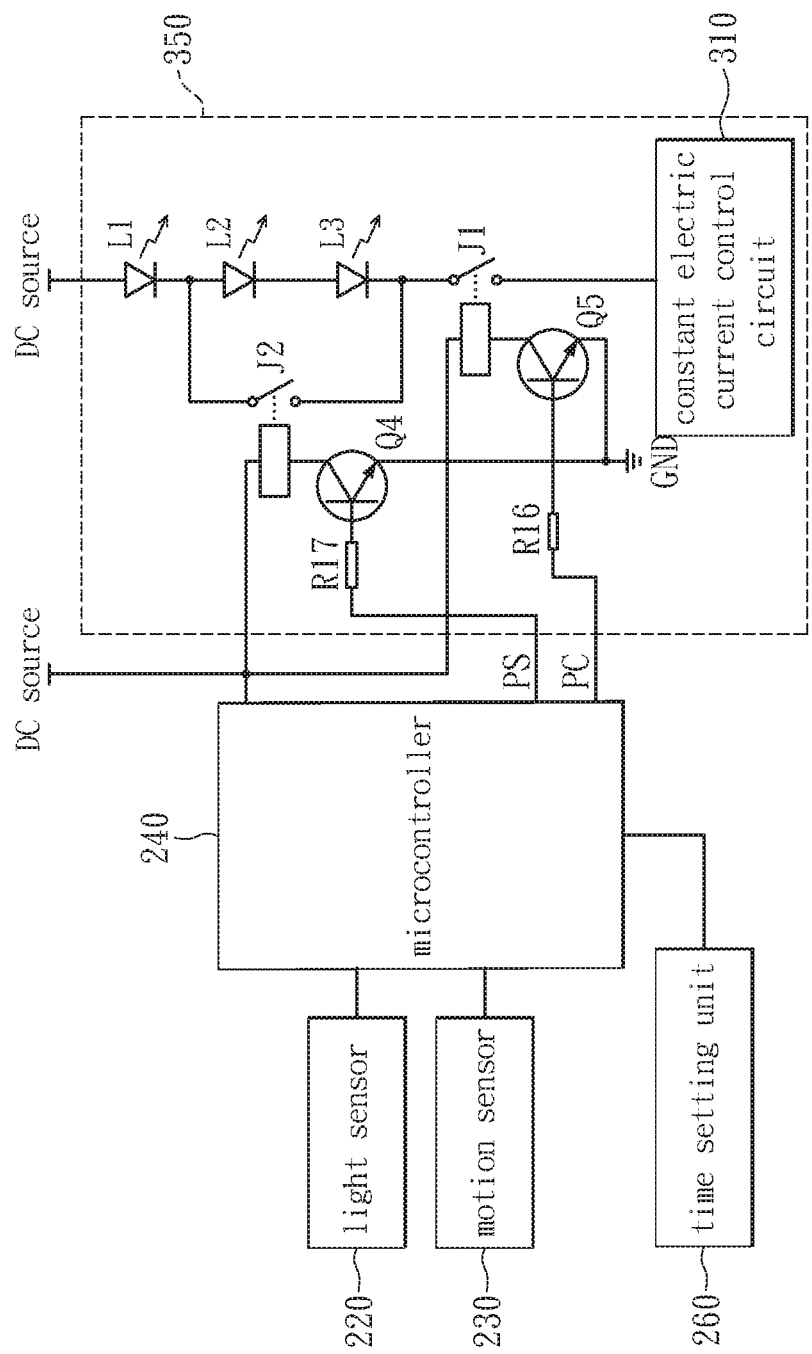
FIG. 3B illustrates a schematic diagram of a two-level LED security light in accordance to the second exemplary embodiment of the present disclosure.

When the motion sensor detects a human motion in the PS mode, the pin PS of the microcontroller 240 temporarily switches from the high voltage to a low voltage, to have the transistor Q2 temporarily cuts-off thus forming the current path 352 to activate all the LEDs in the light-emitting unit 350, thereby temporarily generates the high level illumination. The light-emitting unit 350 is driven by a constant electric current, therefore the illumination level generated thereof is directly proportional to the number of LEDs activated. FIG. 3B illustrates another implementation for FIG. 3A, wherein the relays J1 and J2 are used in place of NMOS transistors to serve as switches. The microcontroller 240 may control the relays J2 and J1 through regulating the switching operations of the NPN bipolar junction transistors Q4 and Q5. Moreover, resistors R16 and R17 are current-limiting resistors.

In the PC mode, the relay J1 being pull-in while the relay J2 bounce off to have constant electric current driving all the LEDs L1~L3 to generate the high level illumination; in PS mode, the relays J1 and J2 both pull-in to have constant electric current only driving the LED L1 thus the low level illumination may be thereby generated. Furthermore, when the motion sensor 230 detects a human motion, the pin PS of the microcontroller 240 may temporarily switch from high voltage to low voltage, forcing the relay J2 to temporarily bounce off and the relay J1 pull-in so as to temporarily generate the high level illumination.

The LED L1 may adopt a LED having color temperature of 2700K while the LEDs L2 and L3 may adopt LEDs having color temperature of 5000K in order to increase the contrast between the high level and the low level illuminations. The number of LEDs included in the light-emitting unit 350 may be more than three, for example five or six LEDs. The transistor Q2 may be relatively parallel to the two ends associated with a plurality of LEDs to adjust the illumination difference between the high and the low illumination levels. Additionally, the light-emitting unit 350 may include a plurality of transistors Q2, which are respectively coupled to the two ends associated with each LED to provide more lighting variation selections. The microcontroller 240 may decide the number of LEDs to turn on in accordance to design needs at different conditions. Based on the explanation of the aforementioned exemplary embodiment, those skills in the art should be able to deduce other implementation and further descriptions are therefore omitted.

Third Exemplary Embodiment

Refer back to FIG. 1, wherein the light-emitting unit 150 may include a phase controller and one or more parallel-connected alternating current (AC) LEDs. The phase controller is coupled between the described one or more parallel-connected ACLEDs and AC power source. The loading and power controller 140 in the instant exemplary embodiment may through the phase controller adjust the average power of the light-emitting unit 150 so as to generate variations in the low level and the high level illuminations.

Figure 4A:
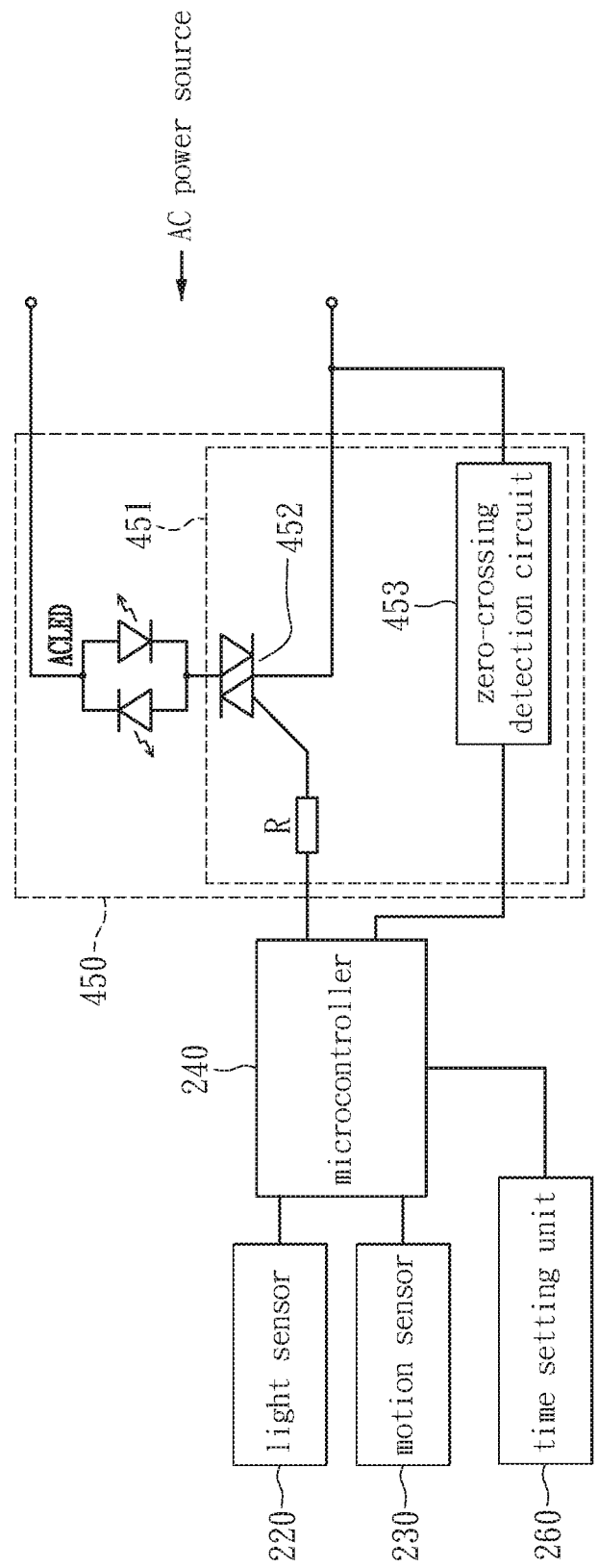
FIG. 4A illustrates a schematic diagram of a two-level LED security light in accordance to the third exemplary embodiment of the present disclosure.

Refer to FIG. 4A, which illustrates a schematic diagram of a two-level LED security light 100 in accordance to the third exemplary embodiment of the present disclosure. The main difference between FIG. 4A and FIG. 3 is in that the light-source load is an ACLED, which is coupled to the AC power source, and further the light-emitting unit 450 includes a phase controller 451. The phase controller 451 includes a bi-directional switching device 452, here, a triac, a zero-crossing detection circuit 453, and a resistor R. The microcontroller 240 turns off the light-emitting unit 450 when the light sensor 220 detects that the ambient light is higher than a predetermined value. Conversely, when the light sensor 220 detects that the ambient light is lower than the predetermined value, the microcontroller 240 activates the PC mode by turning on the light-emitting unit 450. In the PC mode, the microcontroller 240 may select a control pin for outputting a pulse signal which through a resistor R triggers the triac 452 to have a large conduction angle. The large conduction angle configures the light-emitting unit 450 to generate a high level illumination for a predetermined duration. Then the microcontroller 240 outputs the pulse signal for PS mode through the same control pin to trigger thetriac 452 to have a small conduction angle for switching the light-emitting unit 450 from the high level illumination to the low level illumination of the PS mode. Moreover, when the motion sensor 230 (also called motion sensing unit) detects a human motion in the PS mode, the microcontroller 240 temporarily outputs the PC-mode pulse signal through the same control pin to have the light-emitting unit 450 generated the high level illumination for a short predetermined duration. After the short predetermined duration, the light-emitting unit 450 returns to the low level illumination.

In the illumination control of the ACLED, the microcontroller 240 may utilize the detected zero-crossing time (e.g., the zero-crossing time of an AC voltage waveform) outputted from the zero-crossing detection circuit 453 to send an AC synchronized pulse signal thereof which may trigger the triac 452 of the phase controller 451 thereby to change the average power input to the light-emitting unit 450. As the ACLED has a cut-in voltage $V_t$ for start conducting, thus if the pulse signal inaccurately in time triggers the conduction of the triac 452, then the instantaneous value of AC voltage may be lower than the cut-in voltage $V_t$ of ACLED at the trigger pulse. Consequently, the ACLED may result in the phenomenon of either flashing or not turning on. Therefore, the pulse signal generated by the microcontroller 240 must fall in a proper time gap behind the zero-crossing point associated with the AC sinusoidal voltage waveform.

Supposing an AC power source having a voltage amplitude $V_m$ and frequency f, then the zero-crossing time gap $t_D$ of the trigger pulse outputted by the microcontroller 240 should be limited according to $t_o < t_D < \frac{1}{2}f - t_o$ for a light-source load with a cut-in voltage $V_t$, wherein $t_o = (\frac{1}{2}\pi f)\sin^{-1}(V_t/V_m)$. The described criterion is applicable to all types of ACLEDs to assure that the triac 452 can be stably triggered in both positive and negative half cycle of the AC power source. Take ACLED with $V_t$(rms)=80V as an example, and supposing the $V_m$(rms)=110V and f=60 Hz, then $t_o$=2.2 ms and (½f)=8.3 ms may be obtained. Consequently, the proper zero-crossing time gap $t_D$ associated with the phase modulation pulse outputted by the microcontroller 240 which lagged the AC sinusoidal voltage waveform should be designed in the range of 2.2 ms<$t_D$<6.1 ms.

Figure 4B:
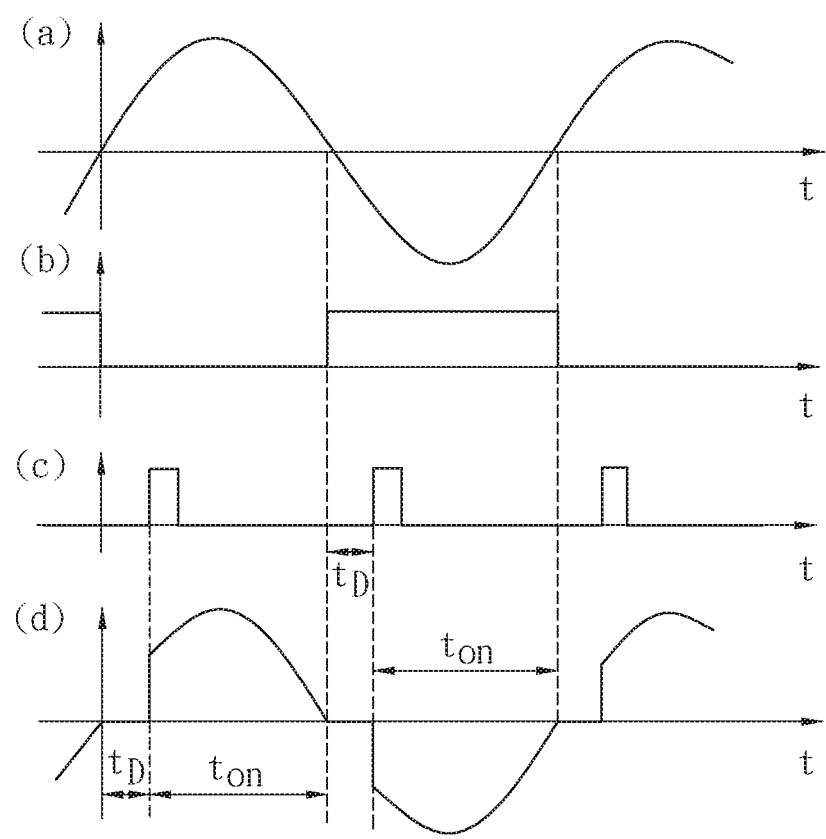
FIG. 4B illustrates a timing waveform of two-level LED security light in accordance to the third exemplary embodiment of the present disclosure.

Refer to FIG. 4B, which illustrates a timing waveform of the two-level LED security light in accordance to the third exemplary embodiment of the present disclosure. Waveforms (a)~(d) of FIG. 4B respectively represent the AC power source, the output of the zero-crossing detection circuit 453, the zero-crossing delay pulse at the control pin of the microcontroller 240, and the voltage waveform across the two ends of the ACLED in the light-emitting unit 450. The zero-crossing detection circuit 453 converts the AC voltage sinusoidal waveform associated with the AC power source to a symmetric square waveform having a low and a high voltage levels as shown in FIG. 4B(b). At the zero-crossing point of the AC voltage sinusoidal wave, the symmetric square waveform may transit either from the low voltage level to the high voltage level or from the high voltage level to the low voltage level. Or equivalently, the edge of the symmetric square waveform in the time domain corresponds to the zero-crossing point of the AC voltage sinusoidal waveform. As shown in FIG. 4B(c), the microcontroller 240 outputs a zero-crossing delay pulse in correspondence to the zero-crossing point of the AC sinusoidal waveform in accordance to the output waveform of the zero-crossing detection circuit 453. The zero-crossing delay pulse is relative to an edge of symmetric square waveform behind a time gap $t_D$ in the time domain. The $t_D$ should fall in a valid range, as described previously, to assure that the triac 452 can be stably triggered thereby to turn on the ACLED. FIG. 4B(d) illustrates a voltage waveform applied across the two ends associated with the ACLED. The illumination level of the light-emitting unit 450 is related to the conduction period $t_{on}$ of the ACLED, or equivalently, the length $t_{on}$ is directly proportional to the average power inputted to the ACLED. The difference between the PC mode and the PS mode being that in the PC mode, the ACLED has longer conduction period, thereby generates the high level illumination; whereas in the PS mode, the ACLED conduction period is shorter, hence generates the low level illumination.

Figure 5:
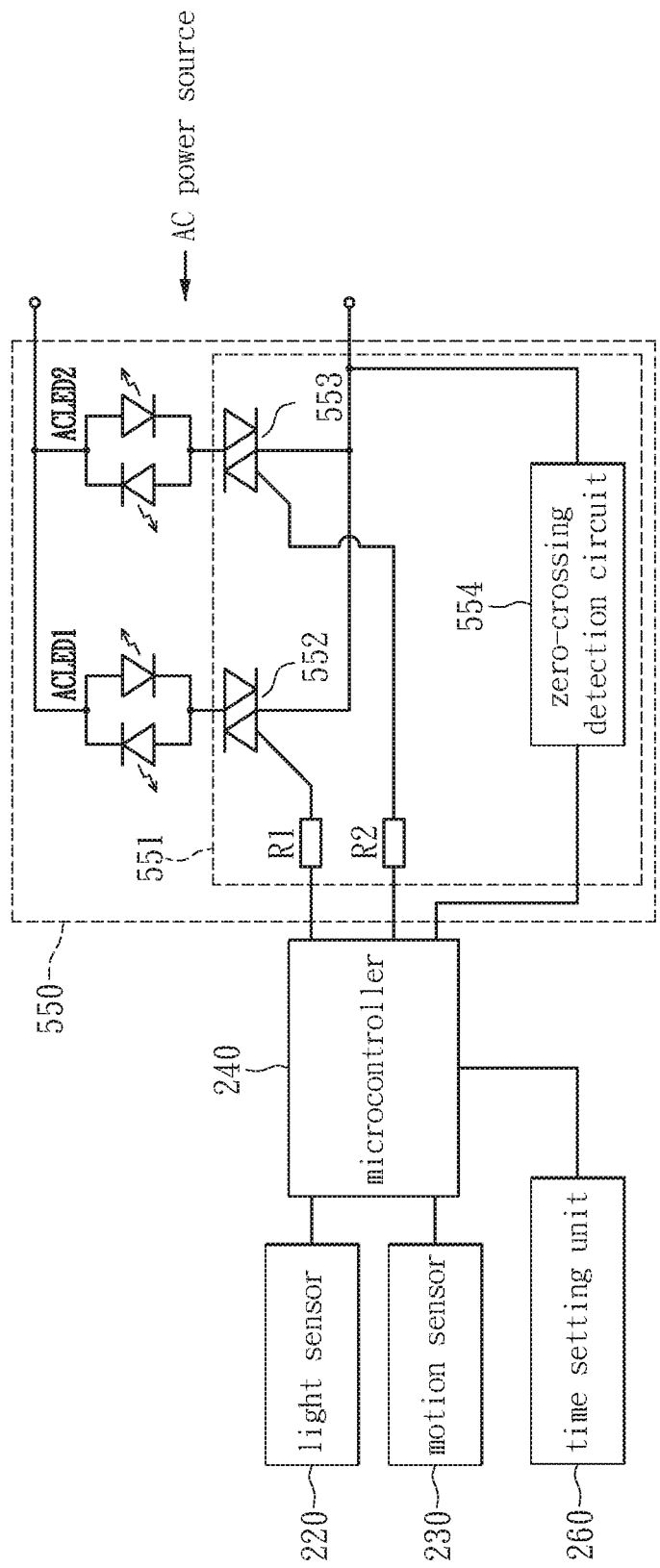
FIG. 5 illustrates a schematic diagram of a two-level LED security light in accordance to the third exemplary embodiment of the present disclosure.

Refer to FIG. 5, which illustrates a schematic diagram of a two-level LED security light 100 in accordance to the third exemplary embodiment of the present disclosure. The light-emitting unit 550 of the lighting apparatus 100 includes an ACLED1, an ACLED2, and a phase controller 551. The phase controller 551 includes triacs 552 and 553, the zero-crossing detection circuit 554 as well as resistors R1 and R2. The light-emitting unit 550 of FIG. 5 is different from the light-emitting unit 450 of FIG. 4 in that the light-emitting unit 550 has more than one ACLEDs and more than one bi-directional switching devices. Furthermore, the color temperatures of the ACLED1 and the ACLED2 may be selected to be different.

In the exemplary embodiment of FIG. 5, the ACLED1 has a high color temperature, and the ACLED2 has a low color temperature. In the PC mode, the microcontroller 240 uses the phase controller 551 to trigger both ACLED1 and ACLED2 to conduct for a long period, thereby to generate the high level illumination as well as illumination of mix color temperature. In the PS mode, the microcontroller 240 uses the phase controller 551 to trigger only the ACLED2 to conduct for a short period, thereby generates the low level illumination as well as illumination of low color temperature. Moreover, in the PS mode, when the motion sensor 230 detects a human motion, the microcontroller 240 may through the phase controller 551 trigger the ACLED1 and ACLED2 to conduct for a long period. Thereby, it may render the light-emitting unit 450 to generate the high level illumination of high color temperature and to produce high contrast in illumination and hue, for a short predetermined duration to warn the intruder. Consequently, the lighting apparatus may generate the high level or the low level illumination of different hue. The rest of operation theories associated with the light-emitting unit 550 are essentially the same as the light-emitting unit 450 and further descriptions are therefore omitted.

Fourth Exemplary Embodiment

Figure 6:
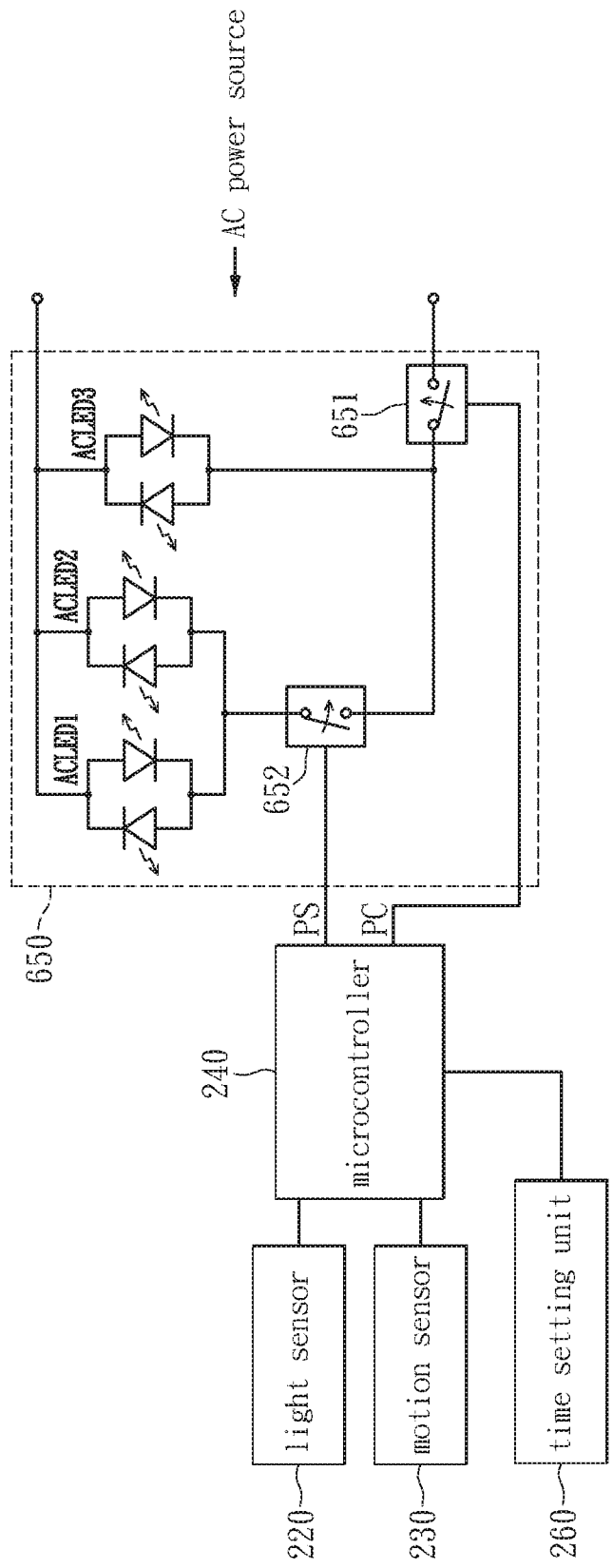
FIG. 6 illustrates a schematic diagram of a two-level LED security light in accordance to the fourth exemplary embodiment of the present disclosure.

Refer to FIG. 6, which illustrates a schematic diagram of a two-level LED security light 100 in accordance to the fourth exemplary embodiment of the present disclosure. The light-emitting unit 150 of FIG. 1 may be implemented by the light-emitting unit 650, wherein the light-emitting unit 650 includes three ACLED1~3 having identical luminous power as well as switches 651 and 652. In which, switches 651 and 652 may be relays. The parallel-connected ACLED1 and ACLED2 are series-connected to the switch 652 to produce double luminous power, and of which the ACLED3 is parallel connected to, to generate triple luminous power, and of which an AC power source is further coupled to through the switch 651. Moreover, the microcontroller 240 implements the loading and power control unit 140 of FIG. 1. The pin PC and pin PS are respectively connected to switches 651 and 652 for outputting voltage signals to control the operations of switches 651 and 652 (i.e., open or close).

In the PC mode, the pin PC and pin PS of the microcontroller 240 control the switches 651 and 652 to be closed at same time. Consequently, the ACLED1~3 are coupled to the AC power source and the light-emitting unit 650 may generate a high level illumination of triple luminous power. After a short predetermined duration, the microcontroller 240 returns to PS mode. In which the switch 651 is closed while the pin PS controls the switch 652 to be opened, consequently, only the ACLED3 is connected to AC power source, and the light-emitting unit 650 may thus generate the low level illumination of one luminous power. In the PS mode, when the motion sensor 230 detects a human motion, the microcontroller 240 temporarily closes the switch 652 to generate high level illumination with triple luminous power for a predetermined duration. After the predetermined duration, the switch 652 returns to open status thereby to generate the low level illumination of one luminous power. The lighting apparatus of FIG. 6 may therefore through controlling switches 651 and 652 generate two level illuminations with illumination contrast of at least 3 to 1.

The ACLED1 and ACLED2 of FIG. 6 may be high power lighting sources having color temperature of 5000K. The ACLED3 may be a low power lighting source having color temperature of 2700K. Consequently, the ACLED may generate two levels of illuminations with high illumination and hue contrast without using a zero-crossing detection circuit.

Fifth Exemplary Embodiment

Figure 7:
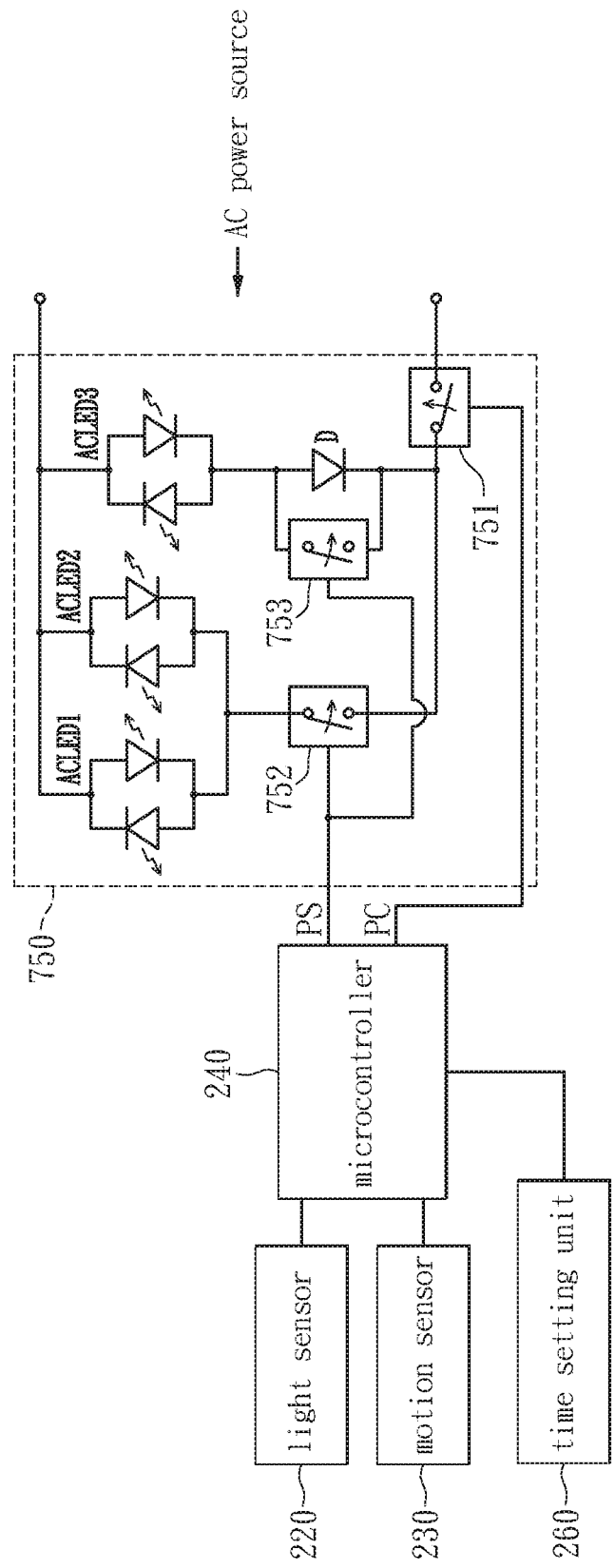
FIG. 7 illustrates a schematic diagram of a two-level LED security light in accordance to the fifth exemplary embodiment of the present disclosure.
Figure 8A:
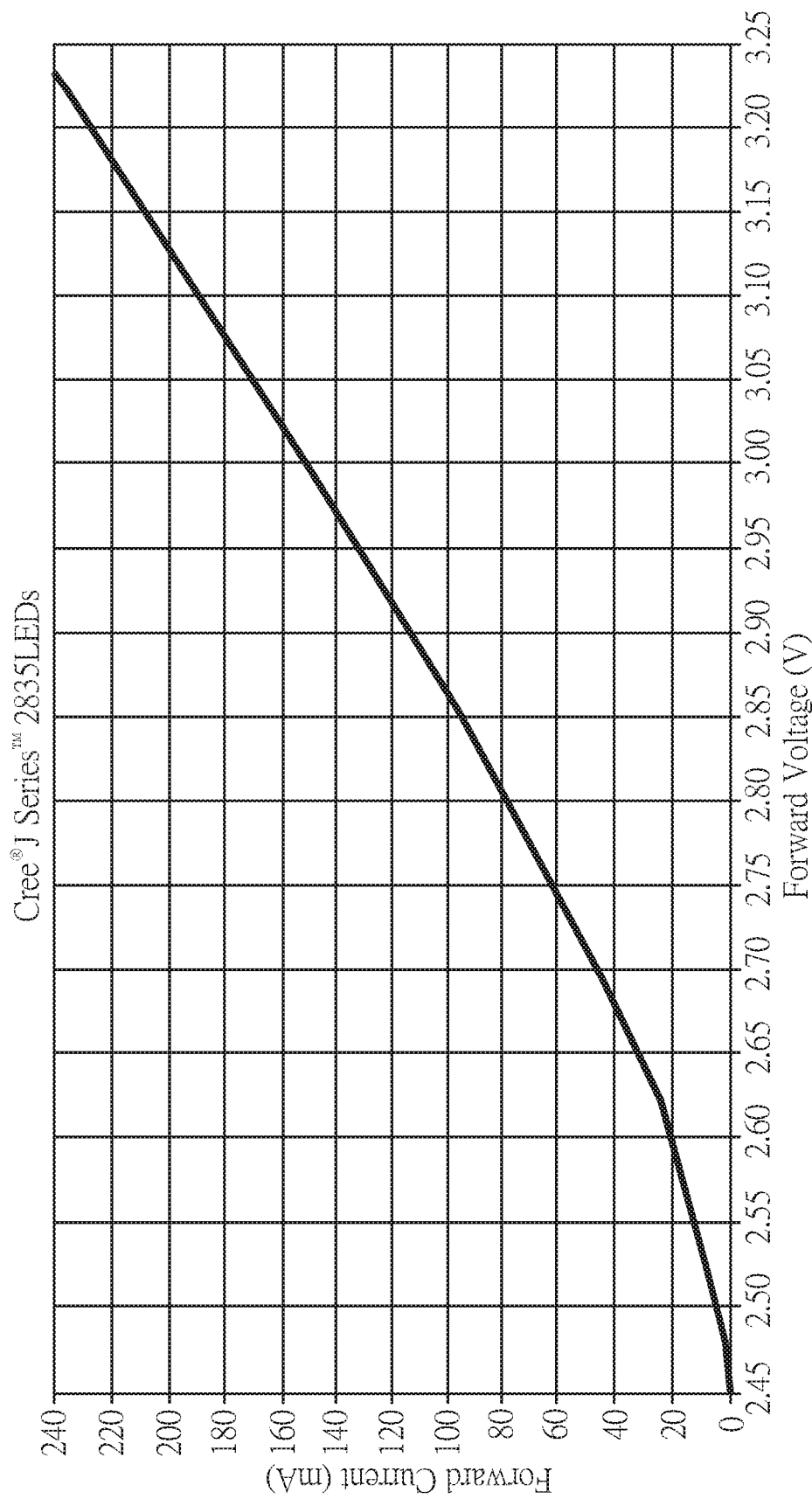
FIGS. 8A, 8B, 8C and 8D schematically and respectively show I-V relationship charts (Forward Current vs. Forward Voltage) for a white LED chip from each of 4 different LED manufacturers.
Figure 8B:
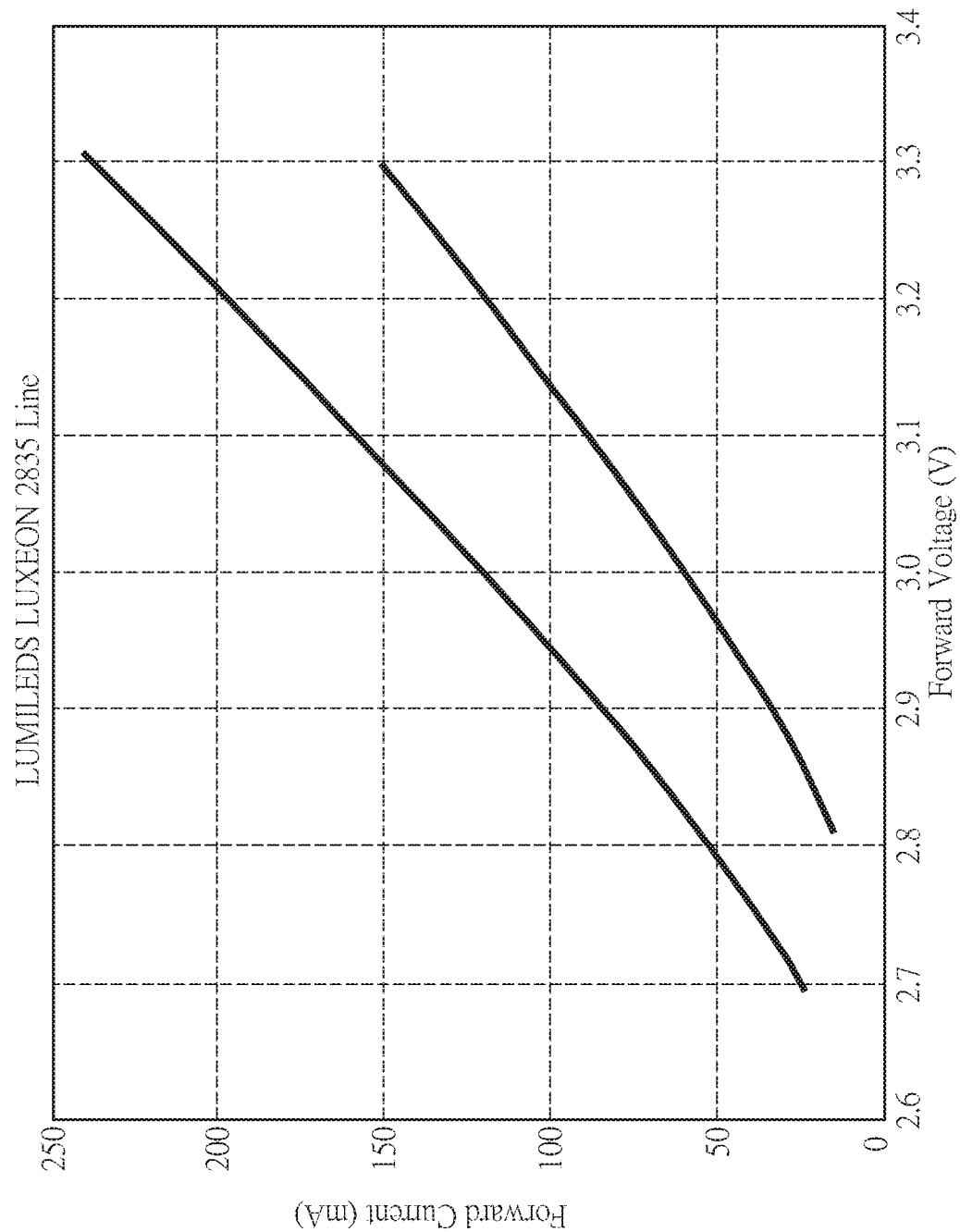
Figure 8C:
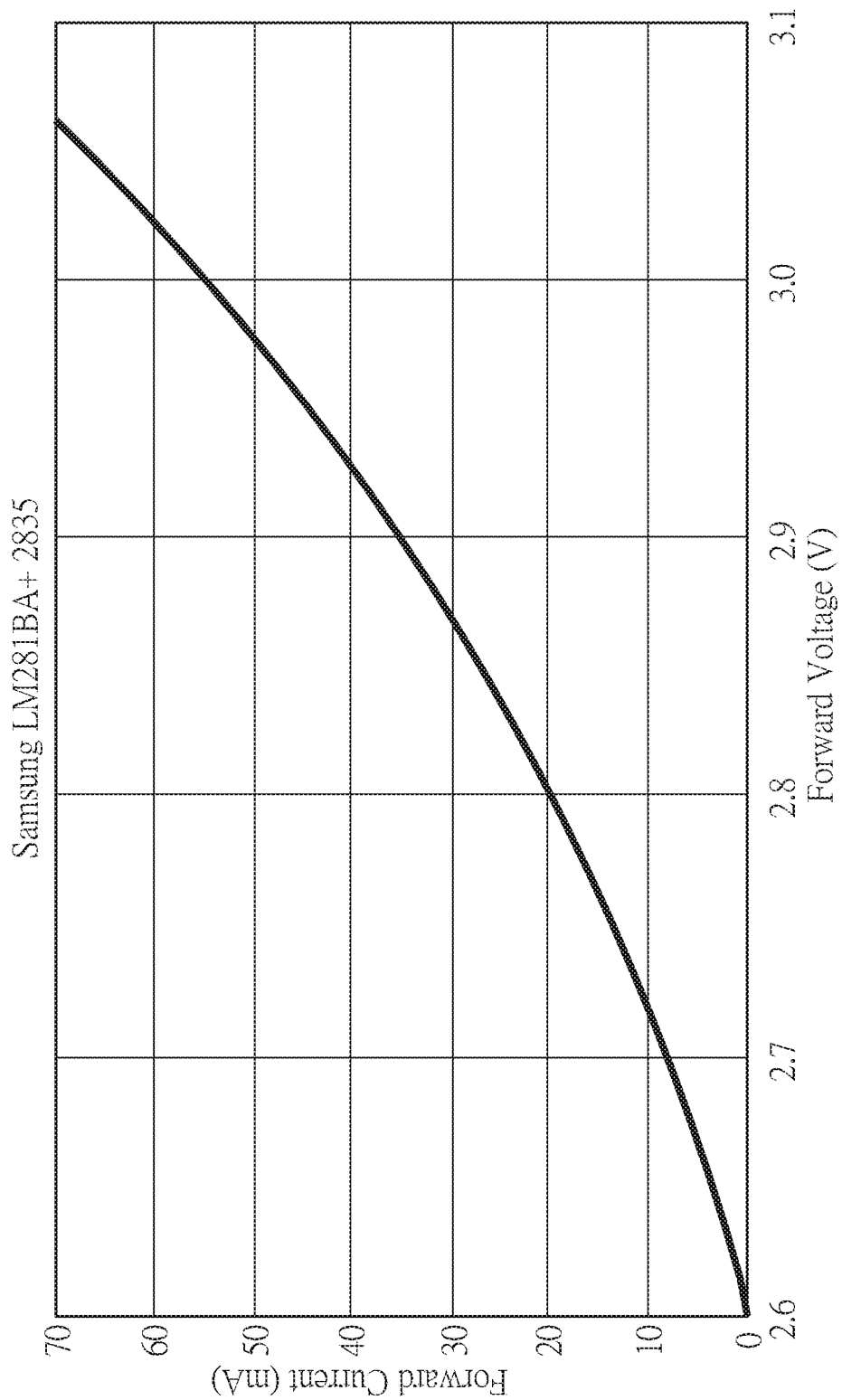
Figure 8D:
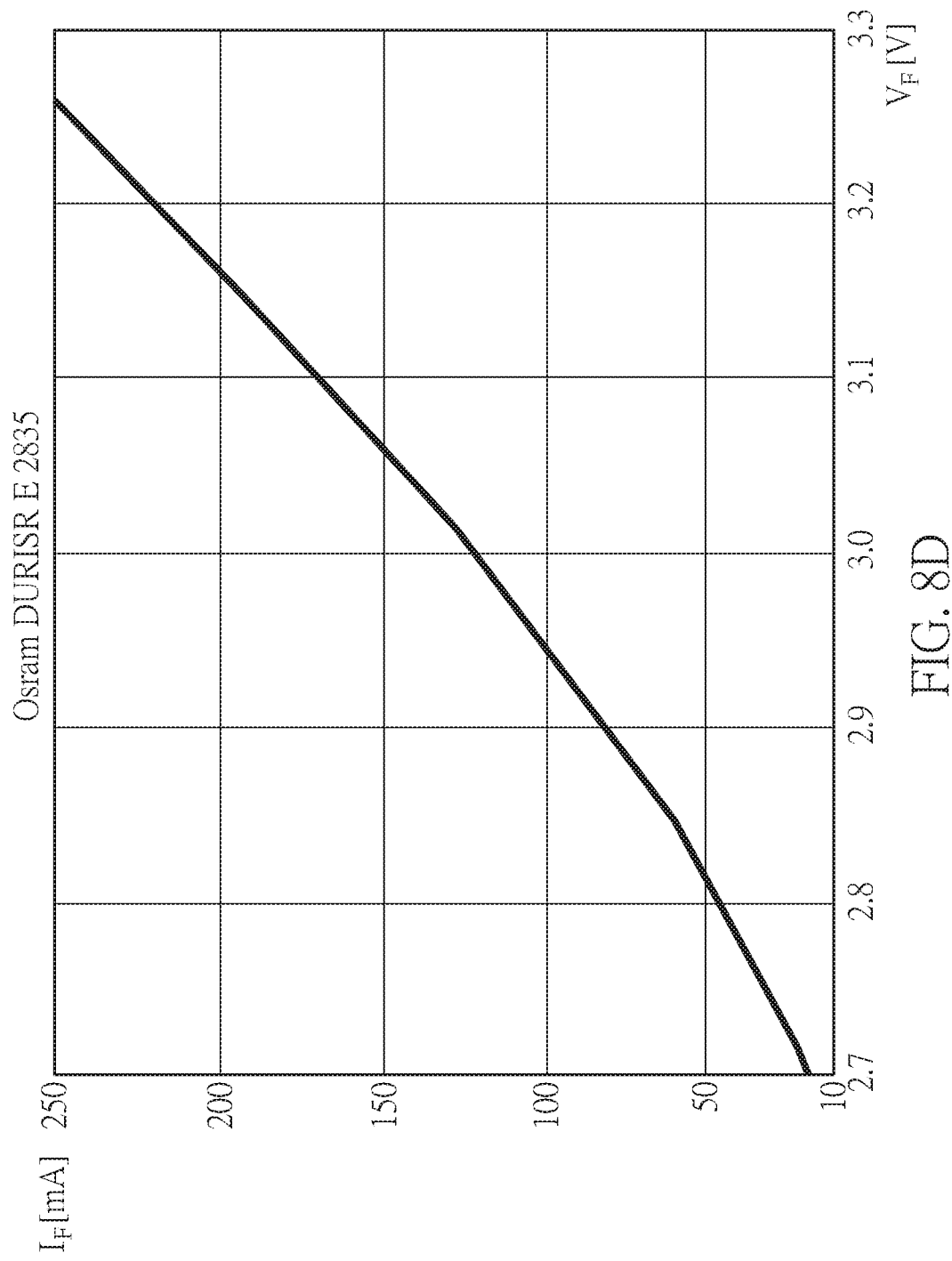

Refer to FIG. 7, which illustrates a schematic diagram of a two-level LED security light in accordance to the fifth exemplary embodiment of the present disclosure. The light-emitting unit 750 of FIG. 7 is different from the light-emitting unit 640 of FIG. 6 in that the ACLED3 is series-connected to a circuit with a rectified diode D and a switch 753 parallel-connected together, and of which is further coupled through a switch 751 to AC power source. When the switch 753 closes, the AC electric current that passes through the ACLED3 may be a full sinusoidal waveform. When the switch 753 opens, the rectified diode rectifies the AC power, thus only one half cycle of the AC electric current may pass through the ACLED, consequently the luminous power of ALCED3 is cut to be half.

The pin PS of the microcontroller 240 synchronously controls the operations of switches 752 and 753. If the three ACLED1~3 have identical luminous power, then in the PC mode, the pin PC and pin PS of the microcontroller 240 synchronously close the switches 751~753 to render ACLED1~3 illuminating, thus the light-emitting unit 750 generates a high level illumination which is three-times higher than the luminous power of a single ACLED. When in the PS mode, the microcontroller 240 closes the switch 751 while opens switches 752 and 753. At this moment, only the ACLED3 illuminates and as the AC power source is rectified by the rectified diode D, thus the luminous power of ACLED3 is half of the AC power source prior to the rectification. The luminous power ratio between the high level and the low level illuminations is therefore 6 to 1. Consequently, strong illumination contrast may be generated to effectively warn the intruder.

It should be noted that the light-emitting unit in the fifth exemplary embodiment is not limited to utilizing ACLEDs. In other words, the light-emitting unit may include any AC lighting sources such as ACLEDs, incandescent lamps, or fluorescent lamps.

A lighting apparatus may be implemented by integrating a plurality of LEDs with a microcontroller and various types of sensor components in the controlling circuit in accordance to the above described five exemplary embodiments. This lighting apparatus may automatically generate high level illumination when the ambient light detected is insufficient and time-switch to the low level illumination. In addition, when a person is entering the predetermined detection zone, the lighting apparatus may switch from the low level illumination to the high level illumination, to provide the person with sufficient illumination or to generate strong illumination and hue contrast for monitoring the intruder.

When the light source of the light emitting unit 150 is confined to the use of an LED load, the compliance and satisfaction of a voltage operating constraint attributable to the unique electrical characteristics of the LED load is vital to a successful performance of an LED lighting device. Any LED lighting device failing to comply with the voltage operating constraint of the unique electrical characteristics is bound to become a trouble art. This is because the LED as a kind of solid state light source has completely different electrical characteristics for performing light emission compared with conventional light source such as incandescent bulbs or fluorescent bulbs. For instance, for a white light or blue light LED there exists a very narrow voltage domain ranging from a threshold voltage at 2.5 volts to a maximum working voltage at 3.3 volts, which allows to operate adequately and safely the LED; in other words, when a forward voltage imposed on the LED is lower than the threshold voltage, the LED is not conducted and therefore no light is emitted, when the forward voltage exceeds the maximum working voltage, the heat generated by a forward current could start damaging the construction of the LED. Therefore, the forward voltage imposed on the LED is required to operate between the threshold voltage and the maximum working voltage.

In respect to the LED load of the light-emitting unit 150, the cut-in voltage $V_t$ of ACLEDs is technically also referred to as the threshold voltage attributable to PN junctions manufactured in LEDs. More specifically, the LED is made with a PN junction semiconductor structure inherently featured with three unique electrical characteristics, the first characteristic is one-way electric conduction through the PN junction fabricated in the LED, the second electrical characteristic is the threshold voltage $V_{th}$ required to trigger the LED to start emitting light and the third electrical characteristic is a maximum working voltage $V_{max}$ allowed to impose on the LED to avoid a thermal runaway to damage or burn out the semiconductor construction of the LED. The described cut-in voltage $V_t$ has the same meaning as the above mentioned threshold voltage $V_{th}$ which is a more general term to be used for describing the second electrical characteristic of a PN junction semiconductor structure. Also because the cut-in voltage $V_t$ is specifically tied to forming a formula to transform the threshold voltage into a corresponding time phase of AC power for lighting control, it is necessary to use the term $V_{th}$ as a neutral word for describing the LED electrical characteristics to avoid being confused with the specific application for ACLED alone. Additionally, it is to be clarified that the term $V_m$ is related to the amplitude of the instant maximum voltage of an AC power source which has nothing to do with the third electrical characteristic $V_{max}$ of an LED load.

An LED chip is a small piece of semiconductor material with at least one LED manufactured inside the semiconductor material. A plurality of LEDs may be manufactured and packaged inside an LED chip for different levels of wattage specification to meet different illumination need. For each LED chip designed with a different level of wattage specification there always exists a narrow voltage domain $V_{th}<V<V_{max}$, wherein V is a voltage across the LED chip, $V_{th}$ is the threshold voltage to enable the LED chip to start emitting light and $V_{max}$ is the maximum working voltage allowed to impose on the LED chip to protect the LED chip from being damaged or burned out by the heat generated by a higher working voltage exceeding $V_{max}$.

For an LED load configured with a plurality of the LED chips in any LED lighting device, regardless such LED load being configured with ACLED chips or DC LED chips, the working voltage V of each single LED chip is required to operate in a domain between a threshold voltage $V_{th}$ and a maximum working voltage $V_{max}$ or $V_{th}<V<V_{max}$ and the working voltage $V_N$ of the LED load comprising N pieces of LED chips connected in series is therefore required to operate in a domain established by a threshold voltage of N times $V_{th}$ (N×$V_{th}$) and a maximum working voltage of N times $V_{max}$ (N×$V_{max}$) or N×$V_{th}<V_N<$N×$V_{max}$, wherein N is the number of the LED chips electrically connected in series. For any LED lighting device comprising an LED load it is required that the LED load in conjunction with an adequate level of power source is configured with a combination of in series and in parallel connections of LED chips such that the electric current passing through each LED chip of the LED load remains at an adequate level such that a voltage V across each LED chip complies with an operating constraint of $V_{th}<V<V_{max}$ featuring electrical characteristics of the LED chip or a voltage $V_N$ across the LED load configured with N number of LED chips connected in series complies with an operating constraint of N×$V_{th}<V_N<$N×$V_{max}$. Such narrow operating range therefore posts an engineering challenge for a circuit designer to successfully design an adequate level of power source and a reliable circuitry configured with an adequate combination of in series connection and in parallel connection of LED chips for operating a higher power LED security light.

FIGS. 8A, 8B, 8C and 8D comprises 4 drawings schematically and respectively showing a I-V relationship chart (Forward Current vs. Forward Voltage) for a white light LED chip from each of 4 different LED manufacturers; as can be seen from the chart when a forward voltage V is below a minimum forward voltage at around 2.5 volts, the LED chip is not conducted so the current I is zero, as the forward voltage exceeds 2.5 volts the LED chip is activated to generate a current flow to emit light, as the forward voltage continues to increase, the current I increases exponentially at a much faster pace, at a maximum forward voltage around 3.3 volts the current I becomes 250 mA which generates a heat that could start damaging the PN junction of the LED chip. The minimum forward voltage, i.e., the threshold voltage or the cut-in voltage, and the maximum forward voltage are readily available in the specification sheets at each of LED manufacturers, such as Cree, Lumileds, Samsung, Osram, and etc. Different LED manufacturers may have slightly different figures due to manufacturing process but the deviations of differences are negligible. The constraints of minimum forward voltage and maximum forward voltage represent physical properties inherent in any solid state light source. They are necessary matter for configuring any LED lighting products to ensure a normal performance of an LED load.

FIG. 9 is a data sheet showing data of the minimum forward voltages and maximum forward voltages collected from various LED manufacturers. They are fundamental requirements for configuring any LED lighting control devices to ensure a successful performance of any LED lighting device.

In summary, the compliance of voltage operating constraint $V_{th}<V<V_{max}$ featuring electrical characteristics of an LED chip is a critical technology for ensuring a normal performance of the LED load. Failing to comply with such voltage operating constraint can quickly age or seriously damage the semiconductor structure of the LED chip with a consequence of quick lumens depreciation of the LED bulbs and the product lifetime being substantially shortened, which will be unacceptable to the consumers. The compliance of the operating constraint $V_{th}<V<V_{max}$ is a necessary matter for any LED lighting device though it is not an obvious matter as it requires complicated technologies to calculate and coordinate among an adequate level of power source, a control circuitry and a non-linear light emitting load. For conventional lighting load such as incandescent bulb there exists no such operating constraint. This is why in the past years there had been many consumers complaining about malfunction of LED bulbs that the consumers were frustrated with the fast depreciation of lumens output and substantially shortened product lifetime of the LED bulbs purchased and used. A good example was a law suit case filed by the Federal Trade Commission on Sep. 7, 2010 (Case No. SACV10-01333 JVS) for a complaint against a leading lighting manufacturer for marketing deceptive LED lamps and making false claims with respect to the life time of their LED lamps and a huge amount of monetary relief was claimed with the Court in the complaint.

The present disclosure of a two-level LED security light provides a unique life-style lighting solution. The motivation of creating such life-style lighting solution has less to do with the energy saving aspect of the low level illumination mode because an LED is already a very energy saving light source compared with the conventional incandescent light source. For instance, a 10-watt LED security light when operated at a low level at 30% illumination it only saves 7 watts, which is not as significant as a 100-watt incandescent bulb which can save as much as 70 watts when operated at 30% illumination for a low level mode. While it is always good to save some extra energy, it is however not the main incentives for developing the present invention; the life-style lighting solution of the present disclosure is featured with two innovations which meaningfully improve the exquisite tastes of living in the evening, the first innovation is the creation of an aesthetic scene for the outdoor living environment, wherein at dusk the LED security light is automatically turned on by the photo sensor to perform the low level illumination with a low color temperature which is necessary for creating a soft and aesthetic night scene for the outdoor living area (such soft and aesthetic night view is not achievable by the high level illumination however), the second innovation is the creation of a navigation capacity similar to a light house effect for guiding people to safely move toward a destination in the outdoor living area without getting lost or encountering an accident, wherein when a motion intrusion is detected by the motion sensor the security light is instantly changed to perform a high level illumination mode with a high color temperature light which offers people a high visibility of the surrounding environment when needed. For the visibility of a surrounding environment the high color temperature light is the winner while for the creation of a soft and aesthetic night view there is no substitute for the low color temperature light. It is the innovation of the present invention to configure a life-style security light with a low color temperature LED load and a high color temperature LED load respectively activated by a photo sensor and a motion sensor to resemble the natural phenomenon of a sun light. These two innovative functions ideally implemented by the LED loads coupled with the motion sensor to increase illumination with a high visibility when people enters into the short detection area make the present invention a perfect life-style lighting solution for enjoying an exquisite taste of evening life.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An LED security light comprising:
    a light-emitting unit comprising a plurality of LEDs divided into two LED loads connected in parallel, including a first LED load with N number LEDs emitting light with a low light color temperature and a second LED load with M number LEDs emitting light with a high light color temperature, wherein M and N are positive integers;
    a light diffuser covering the first LED load and the second LED load to create a diffused light with a diffused light color temperature;
    a loading and power control unit;
    a light sensing control unit;
    a power supply unit; and
    an external control unit including at least a first external control device outputting at least one first external control signal to tune and to select the diffused light color temperature;
    wherein the loading and power control unit comprises a controller and a switching circuitry, wherein the switching circuitry is electrically coupled between at least one DC power source of the power supply unit and the light-emitting unit for controlling and delivering at least one DC power to the light-emitting unit, wherein the switching circuitry comprises a first semiconductor switching device electrically connected to the first LED load and a second semiconductor switching device electrically connected to the second LED load;
    wherein the controller is electrically coupled with the first semiconductor switching device, the second semiconductor switching device, the light sensing control unit and at least the first external control device;
    wherein when the light-emitting unit is in a turned on state, the controller further outputs a first control signal to control a first conduction rate of the first semiconductor switching device and a second control signal to control a second conduction rate of the second semiconductor switching device to respectively deliver a first electric power to the first LED load and a second electric power to the second LED load to generate the diffused light with the diffused light color temperature thru the diffuser according to the at least one first external control signal;
    wherein for tuning the diffused light color temperature to a lower diffused light color temperature, the controller upon receiving the at least one first external control signal operates to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total diffused light intensity generated by the light-emitting unit remains essentially unchanged while the diffused light color temperature is accordingly adjusted to the lower diffused light color temperature;
    wherein for tuning the diffused light color temperature to a higher diffused light color temperature, the controller upon receiving the at least one first external control signal operates to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains essentially unchanged while the diffused light color temperature is accordingly adjusted to the higher diffused light color temperature;
    wherein when an ambient light detected by the light sensing control unit is lower than a first predetermined value, the loading and power control unit operates to turn on the light-emitting unit to perform the diffused light with a selected diffused light color temperature;
    wherein when the ambient light detected by the light sensing control unit is higher than a second predetermined value, the loading and power control unit manages to turn off all the LEDs in the light-emitting unit;
    wherein the N number LEDs of the first LED load and the M number LEDs of the second LED load are respectively designed with a configuration of in series and/or in parallel connections such that when incorporated with a power level setting of the at least one DC power an electric current passing through each LED of the first LED load and each LED of the second LED load remains at an adequate level such that a voltage V across each LED complies with an operating constraint of $V_{th} < V < V_{max}$ featuring electrical characteristics of a LED, where $V_{th}$ is a threshold voltage required to trigger the LED to start emitting light and $V_{max}$ is a maximum operating voltage across the LED to avoid a thermal damage or burning out of LED construction.

2. The LED security light according to claim 1, wherein when each of the first LED load and the second LED load is configured with a plurality of LEDs electrically connected in series or sets of in parallel connected LEDs electrically connected in series, a working voltage across each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

3. The LED security light according to claim 2, wherein when the LED has the voltage V across each LED complying with an operating constraint of 2.5 volts<$V_{th}$<V<$V_{max}$<3.5 volts, the first LED load and the second LED load are required to operate with respective working voltages $V_N$ and $V_M$ confined in domains expressed by $N_S$×2.5 volts<$V_N$<$N_S$×3.5 volts and $M_S$×2.5 volts<$V_M$<$M_S$×3.5 volts, with $N_S$ and $M_S$ respectively denoting the numbers of series connected LEDs in the first LED load and the second LED load, wherein $N_S$≤N and $M_S$≤M.

4. The LED security light according to claim 1, wherein the controller is designed with a diffused light color temperature switching scheme comprising a plurality of different diffused light color temperature performances to be activated by the first external control device, wherein different paired combinations of the first conduction rate and the second conduction rate respectively for controlling the first electric power delivered to the first LED load and the second electric power delivered to the second LED load for creating different diffused light color temperature performances are preprogrammed and executed by the controller for operating a pick and play process according to the at least one first external control signal generated by the first external control device for selecting a corresponding diffused light color temperature performance in the diffused light color temperature switching scheme.

5. The LED security light according to claim 4, wherein the at least one first external control signal is a short power interruption signal generated by operating a main power switch, a push button, a touch sensor or a wireless remote control device, wherein a power interruption detection circuit is electrically coupled with the controller, wherein when the short power interruption signal is detected by the power interruption detection circuit, the controller operates to alternately perform the corresponding diffused light color temperature performance in the diffused light color temperature switching scheme according to a prearranged sequence.

6. The LED security light according to claim 5, wherein when the main power switch is used for generating the short power interruption signal, the main power switch is turned off and turned back on within a predetermined time interval.

7. The LED security light according to claim 5, wherein when the push button or the touch sensor is used, a signal detection circuitry is connected to the push button or the touch sensor, wherein when the push button or the touch sensor is operated, a voltage signal is transmitted to the signal detection circuitry to actuate a momentary power interruption and consequently the short power interruption signal is generated and detected by the power interruption detection circuit, the controller accordingly operates to alternately perform the corresponding diffused light color temperature performance in the diffused light color temperature switching scheme according to a prearranged sequence.

8. The LED security light according to claim 4, wherein the first external control device is a voltage divider operated by a user to output a plurality of voltage signals interpretable by the controller for executing the pick and play process for respectively selecting and performing the corresponding diffused light color temperature performance in the diffused light color temperature switching scheme; wherein the voltage divider is configured to output the plurality of voltage signals respectively represented by a voltage value, wherein the controller operates to activate the diffused light color temperature switching scheme to generate a corresponding diffused light color temperature performance in the diffused light color temperature switching scheme according to the voltage value outputted by the voltage divider.

9. The LED security light according to claim 8, wherein the voltage divider is operated with a configuration of a slide switch, a rotary switch, or a pull chain switch, designed with a plurality of switching positions operable by a user for selecting and performing the corresponding diffused light color temperature performance from the diffused light color temperature switching scheme.

10. The LED security light according to claim 4, wherein the first external control device is a wireless remote control device comprising at least one wireless external signal receiver electrically coupled with the controller to receive at least one wireless external control signal and convert the at least one wireless external control signal into the at least one first external control signal interpretable by the controller for activating the pick and play process to select and perform the corresponding diffused light color temperature performance in the diffused light color temperature switching scheme.

11. The LED security light according to claim 4, wherein the first external control device is an active infrared ray sensor for detecting an infrared light reflected from an object and converting the infrared light reflected from the object into the at least one first external control signal interpretable by the controller for executing the pick and play process for selecting and performing the corresponding diffused light color temperature performance from the diffused light color temperature switching scheme.

12. The LED security light according to claim 4, wherein the diffused light color temperature switching scheme comprises at least a high diffused light color temperature performance and a low diffused light color temperature performance, wherein for performing the high diffused light color temperature performance the second semiconductor switching device is fully conducted and the first semiconductor switching device is completely cut off, wherein for performing the low diffused light color temperature performance the first semiconductor switching device is fully conducted and the second semiconductor switching device is completely cut off.

13. The LED security light according to claim 4, wherein the light color temperature switching scheme comprises at least a high diffused light color temperature performance, a low diffused light color temperature performance and a medium diffused light color temperature performance, wherein for performing the high diffused light color temperature performance the second semiconductor switching device is fully conducted and the first semiconductor switching device is completely cut off, wherein for performing the low diffused light color temperature performance the first semiconductor switching device is fully conducted while the second semiconductor switching device is completely cut off, wherein for performing the medium diffused light color temperature performance the first semiconductor switching device and the second semiconductor switching device are both partially and complementarily conducted such that the total light intensity generated by the light-emitting unit remains essentially unchanged.

14. The LED security light according to claim 13, wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

15. The LED security light according to claim 4, wherein the at least one external control device is a push button or a touch sensor, wherein when the push button or the touch sensor is operated, the controller accordingly operates to activate the pick and play process to alternately perform one of the diffused light color temperatures in the diffused light color temperature switching scheme according to a prearranged sequence.

16. The LED security light according to claim 4, wherein the at least one external control device is a selection switch electrically connectable to a plurality of switching positions with each switching position being electrically and respectively coupled with a control pin of the controller, wherein when the selection switch is connected to one of the plurality of switching positions a constant voltage signal is delivered to a corresponding control pin of the controller to activate the diffused light color temperature switching scheme for selecting the corresponding diffused light color temperature.

17. The LED security light according to claim 1, wherein M is equal to N.

18. The LED security light according to claim 1, wherein M is smaller than N.

19. The LED security light according to claim 1, wherein the low color temperature is designed in a range between 2000 K and 3000 K, the high color temperature is designed in the range between 5000 K and 6500 K.

20. An LED security light comprising:
- a light-emitting unit comprising a plurality of LEDs divided into two LED loads connected in parallel, including a first LED load with N number LEDs emitting light with a low light color temperature and a second LED load with M number LEDs emitting light with a high light color temperature, wherein M and N are positive integers;
- a light diffuser covering the first LED load and the second LED load to create a diffused light with a diffused light color temperature;
- a loading and power control unit;
- a light sensing control unit;
- a motion sensing unit;
- a power supply unit; and
- an external control unit including at least a first external control device outputting at least one first external control signal to tune and to select the diffused light color temperature;
- wherein the loading and power control unit comprises a controller and a switching circuitry, wherein the switching circuitry is electrically coupled between at least one DC power source of the power supply unit and the light-emitting unit for controlling and delivering at least one DC power to the light-emitting unit, wherein the switching circuitry comprises a first semiconductor switching device electrically connected to the first LED load and a second semiconductor switching device electrically connected to the second LED load;
- wherein the controller is electrically coupled with the first semiconductor switching device, the second semiconductor switching device, the light sensing control unit, the motion sensing unit and at least the first external control device;
- wherein when the light-emitting unit is in a turned on state, the controller further outputs a first control signal to control a first conduction rate of the first semiconductor switching device and a second control signal to control a second conduction rate of the second semiconductor switching device to respectively deliver a first electric power to the first LED load and a second electric power to the second LED load to generate the diffused light with the diffused light color temperature thru the diffuser according to the at least one first external control signal;
- wherein for tuning the diffused light color temperature to a lower diffused light color temperature, the controller upon receiving the at least one first external control signal operates to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total diffused light intensity generated by the light-emitting unit remains essentially unchanged while the diffused light color temperature is accordingly adjusted to the lower diffused light color temperature;
- wherein for tuning the diffused light color temperature to a higher diffused light color temperature, the controller upon receiving the at least one first external control signal operates to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains essentially unchanged while the diffused light color temperature is accordingly adjusted to the higher diffused light color temperature;
- wherein when an ambient light detected by the light sensing control unit is lower than a first predetermined value, the loading and power control unit operates to activate the motion sensing unit;
- wherein when a motion intrusion is detected by the motion sensing unit, the loading and power control unit operates to deliver an electric power to the light-emitting unit to generate a high level illumination with a selected diffused light color temperature according to a sensing signal received from the motion sensing unit for a predetermined time duration before resuming to a turned off state of the light-emitting unit;
- wherein when the ambient light detected by the light sensing control unit is higher than a second predetermined value, the loading and power control unit manages to deactivate the motion sensing unit and turn off all LEDs of the light-emitting unit;
- wherein the N number LEDs of the first LED load and the M number LEDs of the second LED load are respectively designed with a configuration of in series and/or in parallel connections such that when incorporated with a power level setting of the at least one DC power an electric current passing through each LED of the first LED load and each LED of the second LED load remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across the LED to avoid a thermal damage or burning out of LED construction.

21. The LED security light according to claim 20, wherein when each of the first LED load and the second LED load is configured with a plurality of LEDs electrically connected in series or sets of in parallel connected LEDs electrically connected in series, a working voltage across each of the first LED load and the second LED load is confined in a domain between a minimum voltage equal to the sum of the threshold voltages of all LEDs electrically connected in series or sets of in parallel connected LEDs electrically connected in series and a maximum operating voltage equal to the sum of the maximum operating voltages of all LEDs electrically connected in series or sets of in parallel connected LEDs electrically connected in series.

22. The LED security light according to claim 21, wherein when the LED has the voltage V across each LED complying with an operating constraint of 2.5 volts$<V_{th}<V<V_{max}<$3.5 volts, the first LED load and the second LED load are required to operate with respective working voltages $V_N$ and $V_M$ confined in domains expressed by $N_S \times 2.5$ volts$<V_N<N_S \times 3.5$ volts and $M_S \times 2.5$ volts$<V_M<M_S \times 3.5$ volts, with $N_S$ and $M_S$ respectively denoting the numbers of series connected LEDs in the first LED load and the second LED load, wherein $N_S \leq N$ and $M_S \leq M$.

23. The LED security light according to claim 20, wherein the controller is designed with a diffused light color temperature switching scheme comprising a plurality of different diffused light color temperature performances to be activated by the first external control device, wherein different paired combinations of the first conduction rate and the second conduction rate respectively for controlling the first electric power delivered to the first LED load and the second electric power delivered to the second LED load for creating different diffused light color temperatures are preprogrammed and executed by the controller for operating a pick and play process according to the at least one first external control signal generated by the first external control device for selecting a corresponding diffused light color temperature performance in the diffused light color temperature switching scheme.

24. The LED security light according to claim 23, wherein the at least one first external control signal is a short power interruption signal generated by operating a main power switch, a push button, a touch sensor or a wireless remote control device, wherein a power interruption detection circuit is electrically coupled with the controller, wherein when the short power interruption signal is detected by the power interruption detection circuit, the controller operates to alternately perform the corresponding diffused light color temperature performance in the diffused light color temperature switching scheme according to a prearranged sequence.

25. The LED security light according to claim 24, wherein when the main power switch is used for generating the short power interruption signal, the main power switch is turned off and turned back on within a predetermined time interval.

26. The LED security light according to claim 24, wherein when the push button or the touch sensor is used, a signal detection circuitry is connected to the push button or the touch sensor, wherein when the push button or the touch sensor is operated, a voltage signal is transmitted to the signal detection circuitry to actuate a momentary power interruption and consequently the short power interruption signal is generated and detected by the power interruption detection circuit, the controller accordingly operates to alternately perform the corresponding diffused light color temperature performance in the diffused light color temperature switching scheme according to a prearranged sequence.

27. The LED security light according to claim 23, wherein the first external control device is a voltage divider operated by a user to output a plurality of voltage signals interpretable by the controller for executing the pick and play process for respectively selecting and performing the corresponding diffused light color temperature performance in the diffused light color temperature switching scheme; wherein the voltage divider is configured to output the plurality of voltage signals respectively represented by a voltage value, wherein the controller operates to activate the diffused light color temperature switching scheme to generate a corresponding diffused light color temperature performance in the diffused light color temperature switching scheme according to the voltage value outputted by the voltage divider.

28. The LED security light according to claim 12, wherein the voltage divider is operated with a configuration of a slide switch, a rotary switch, or a pull chain switch, designed with a plurality of switching positions operable by a user for selecting and performing the corresponding diffused light color temperature performance from the diffused light color temperature switching scheme.

29. The LED security light according to claim 23, wherein the first external control device is a wireless remote control device comprising at least one wireless external signal receiver electrically coupled with the controller to receive at least one wireless external control signal and convert the at least one wireless external control signal into the at least one first external control signal interpretable by the controller for activating the pick and play process to select and perform the corresponding diffused light color temperature performance in the diffused light color temperature switching scheme.

30. The LED security light according to claim 23, wherein the first external control device is an active infrared ray sensor for detecting an infrared light reflected from an object and converting the infrared light reflected from the object into the at least one first external control signal interpretable by the controller for executing the pick and play process for selecting and performing the corresponding diffused light color temperature performance from the diffused light color temperature switching scheme.

31. The LED security light according to claim 23, wherein the diffused light color temperature switching scheme comprises at least a high diffused light color temperature performance and a low diffused light color temperature performance, wherein for performing the high diffused light color temperature performance the second semiconductor switching device is fully conducted and the first semiconductor switching device is completely cut off, wherein for performing the low diffused light color temperature performance the first semiconductor switching device is fully conducted and the second semiconductor switching device is completely cut off.

32. The LED security light according to claim 23, wherein the diffused light color temperature switching scheme comprises at least a high diffused light color temperature performance, a low diffused light color temperature performance and a medium diffused light color temperature performance, wherein for performing the high diffused light color temperature performance the second semiconductor switching device is fully conducted and the first semiconductor switching device is completely cut off, wherein for performing the low diffused light color temperature performance the first semiconductor switching device is fully conducted while the second semiconductor switching device is completely cut off, wherein for performing the medium diffused light color temperature performance the first semiconductor switching device and the second semiconductor switching device are both partially and complementarily conducted such that the total light intensity generated by the light-emitting unit remains essentially unchanged.

33. The LED security light according to claim 32, wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

34. The LED security light according to claim 23, wherein the at least one external control device is a push button or a touch sensor, wherein when the push button or the touch sensor is operated, the controller accordingly operates to activate the pick and play process to alternately perform one of the diffused light color temperatures in the diffused light color temperature switching scheme according to a prearranged sequence.

35. The LED security light according to claim 23, wherein the at least one external control device is a selection switch electrically connectable to a plurality of switching positions with each switching position being electrically and respectively coupled with a control pin of the controller, wherein when the selection switch is connected to one of the plurality of switching positions a constant voltage signal is delivered to a corresponding control pin of the controller to activate the diffused light color temperature switching scheme for selecting the corresponding diffused light color temperature.

36. The LED security light according to claim 20, wherein M is equal to N.

37. The LED security light according to claim 20, wherein M is smaller than N.

38. The LED security light according to claim 20, wherein the low color temperature is designed in a range between 2000 K and 3000 K, the high color temperature is designed in the range between 5000 K and 6500 K.

39. A method of configuring an LED lighting device with a tunable diffused light color temperature, comprising:
using a light-emitting unit comprising a plurality of LEDs being divided into at least two LED loads including at least a first LED load with N number LEDs emitting light with a low color temperature and at least a second LED load with M number LEDs emitting light with a high color temperature; the first LED load and the second LED load being electrically connected in parallel;
using a light diffuser covering the first LED load and the second LED load to create a diffused light with a diffused light color temperature;
using an LED driver circuitry electrically coupled between a power source and the light-emitting unit to output at least one DC power to the light-emitting unit;
using a first semiconductor switching device electrically connected between the LED driver circuitry and the first LED load to control a power level of a first electric power delivered to the first LED load;
using a second semiconductor switching device electrically connected between the LED driver circuitry and the second LED load to control a power level of a second electric power delivered to the second LED load;
using a controller, electrically coupled with the first semiconductor switching device and the second semiconductor switching device to respectively control a first conduction rate of the first semiconductor switching device and a second conduction rate of the second semiconductor switching device;
using at least a first external control device electrically coupled with the controller to output at least one first external control signal to tune and to select a corresponding diffused light color temperature performance;
wherein when the light-emitting unit is in a turned on state, the controller outputs the first control signal to control the first conduction rate of the first semiconductor switching device and the second control signal to control the second conduction rate of the second semiconductor switching device to respectively deliver the first electric power to the first LED load and the second electric power to the second LED load to generate the diffused light with the diffused light color temperature thru the diffuser according to the at least one first external control signal;
wherein for tuning the diffused light color temperature to a lower diffused light color temperature, the controller upon receiving the at least one first external control signal operates to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total diffused light intensity generated by the light-emitting unit remains essentially unchanged while the diffused light color temperature is accordingly adjusted to the lower diffused light color temperature;
wherein for tuning the diffused light color temperature to a higher diffused light color temperature, the controller upon receiving the at least one first external control signal operates to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains essentially unchanged while the diffused light color temperature is accordingly adjusted to the higher diffused light color temperature;
wherein the first LED load and the second LED load are respectively designed with a configuration of in series and/or in parallel connections such that when incorporated with a power level setting of the at least one DC power an electric current passing through each LED of the first LED load and each LED of the second LED load remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across the LED to avoid a thermal damage or burning out of LED construction.

40. The method of configuring an LED lighting device with a tunable diffused light color temperature according to claim 39, wherein the controller is designed with a diffused light color temperature switching scheme comprising a plurality of different diffused light color temperature performances to be respectively activated by the at least one first external control signal generated by the first external control device, wherein different paired combinations of the first conduction rate and the second conduction rate respectively for controlling the first electric power delivered to the first LED load and the second electric power delivered to the second LED load for creating different diffused light color temperatures are preprogrammed and executed by the controller for operating a pick and play process according to the at least one first external control signal generated by the first external control device for selecting a corresponding diffused light color temperature performance in the diffused light color temperature switching scheme.

41. The method of configuring an LED lighting device with a tunable diffused light color temperature according to claim 40, wherein the at least one first external control signal is a short power interruption signal generated by operating a main power switch, a push button, a touch sensor or a wireless remote control device, wherein a power interruption detection circuit is electrically coupled with the controller, wherein when the short power interruption signal is detected by the power interruption detection circuit, the controller operates to alternately perform the corresponding diffused light color temperature performance in the diffused light color temperature switching scheme according to a prearranged sequence.

42. The method of configuring an LED lighting device with a tunable diffused light color temperature according to claim 41, wherein when the main power switch is used for generating the short power interruption signal, the main power switch is turned off and turned back on within a predetermined time interval.

43. The method of configuring an LED lighting device with a tunable diffused light color temperature according to claim 41, wherein when the push button or the touch sensor is used, a signal detection circuitry is connected to the push button or the touch sensor, wherein when the push button or the touch sensor is operated, a voltage signal is transmitted to the signal detection circuitry to actuate a momentary power interruption and consequently the short power interruption signal is generated and detected by the power interruption detection circuit, the controller accordingly operates to alternately perform the corresponding diffused light color temperature performance in the diffused light color temperature switching scheme according to the prearranged sequence.

44. The method of configuring an LED lighting device with a tunable diffused light color temperature according to claim 40, wherein the first external control device is a voltage divider operated by a user to output a plurality of voltage signals interpretable by the controller for executing the pick and play process for respectively selecting and performing the corresponding diffused light color temperature performance in the diffused light color temperature switching scheme; wherein the voltage divider is configured to output the plurality of voltage signals respectively represented by a voltage value, wherein the controller operates to activate the diffused light color temperature switching scheme to generate a corresponding diffused light color temperature performance in the diffused light color temperature switching scheme according to the voltage value outputted by the voltage divider.

45. The method of configuring an LED lighting device with a tunable diffused light color temperature according to claim 44, wherein the voltage divider is operated with a configuration of a slide switch, a rotary switch, or a pull chain switch, designed with a plurality of switching positions operable by a user for selecting and performing the corresponding diffused light color temperature performance from the diffused light color temperature switching scheme.

46. The method of configuring an LED lighting device with a tunable diffused light color temperature according to claim 40, wherein the first external control device is a wireless remote control device comprising at least one wireless external signal receiver electrically coupled with the controller to receive at least one wireless external control signal and convert the at least one wireless external control signal into the at least one first external control signal interpretable by the controller for activating the pick and play process to select and perform the corresponding diffused light color temperature performance in the diffused light color temperature switching scheme.

47. The method of configuring an LED lighting device with a tunable diffused light color temperature according to claim 40, wherein the first external control device is an active infrared ray sensor for detecting an infrared light reflected from an object and converting the infrared light reflected from the object into the at least one first external control signal interpretable by the controller for executing the pick and play process for selecting and performing the corresponding diffused light color temperature performance from the diffused light color temperature switching scheme.

48. The method of configuring an LED lighting device with a tunable diffused light color temperature according to claim 40, wherein the diffused light color temperature switching scheme comprises at least a high diffused light color temperature performance and a low diffused light color temperature performance, wherein for performing the high diffused light color temperature performance the second semiconductor switching device is fully conducted and the first semiconductor switching device is completely cut off, wherein for performing the low diffused light color temperature performance the first semiconductor switching device is fully conducted and the second semiconductor switching device is completely cut off.

49. The method of configuring an LED lighting device with a tunable diffused light color temperature according to claim 40, wherein the diffused light color temperature switching scheme comprises at least a high diffused light color temperature performance, a low diffused light color temperature performance and a medium diffused light color temperature performance, wherein for performing the high diffused light color temperature performance the second semiconductor switching device is fully conducted and the first semiconductor switching device is completely cut off, wherein for performing the low diffused light color temperature performance the first semiconductor switching device is fully conducted while the second semiconductor switching device is completely cut off, wherein for performing the medium diffused light color temperature performance the first semiconductor switching device and the second semiconductor switching device are both partially and complementarily conducted such that the total light intensity generated by the light-emitting unit remains essentially unchanged.

50. The method of configuring an LED lighting device with a tunable diffused light color temperature according to claim 49, wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

51. The method of configuring an LED lighting device with a tunable diffused light color temperature according to claim 40, wherein the at least one external control device is a push button or a touch sensor, wherein when the push button or the touch sensor is operated the controller accordingly operates to activate the pick and play process to alternately perform one of the diffused light color temperatures in the diffused light color temperature switching scheme according to a prearranged sequence.

52. The method of configuring an LED lighting device with a tunable diffused light color temperature according to claim 40, wherein the at least one external control device is a selection switch electrically connectable to a plurality of switching positions with each switching position being electrically and respectively coupled with a control pin of the controller, wherein when the selection switch is connected to one of the plurality of switching positions a constant voltage signal is delivered to a corresponding control pin of the controller to activate the diffused light color temperature switching scheme for selecting the corresponding diffused light color temperature.

53. The method of configuring an LED lighting device with a tunable diffused light color temperature according to claim 39, wherein when each of the first LED load and the second LED load is configured with a plurality of LEDs electrically connected in series or sets of in parallel connected LEDs electrically connected in series, a working voltage across each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

54. The method of configuring an LED lighting device with a tunable diffused light color temperature according to claim 53, wherein when the LED has the voltage V across each LED complying with an operating constraint of 2.5 volts<$V_{th}$<V<$V_{max}$<3.5 volts, the first LED load and the second LED load are required to operate with respective working voltages $V_N$ and $V_M$ confined in domains expressed by $N_S$×2.5 volts<$V_N$<$N_S$×3.5 volts and $M_S$×2.5 volts<$V_M$<$M_S$×3.5 volts, with $N_S$ and $M_S$ respectively denoting the numbers of series connected LEDs in the first LED load and the second LED load, wherein $N_S$≤N and $M_S$≤M.

55. The method of configuring an LED lighting device with a tunable diffused light color temperature according to claim 39, wherein the low color temperature is designed in a range between 2000 K and 3000 K, the high color temperature is designed in the range between 5000 K and 6500 K.

56. An LED lighting device configured with a tunable diffused light color temperature, comprising:
 a light-emitting unit comprising a plurality of LEDs divided into at least two LED loads including at least a first LED load with N number LEDs emitting light with a low color temperature and at least a second LED load with M number LEDs emitting light with a high color temperature; the first LED load and the second LED load being electrically connected in parallel;
 a light diffuser covering the first LED load and the second LED load to create a diffused light with a diffused light color temperature;
 an LED driver circuitry electrically connected to at least one power source to output at least one DC power to the light-emitting unit;
 a first semiconductor switching device electrically connected between the LED driver circuitry and the first LED load;
 a second semiconductor switching device electrically connected between the LED driver circuitry and the second LED load;
 at least a first external control device to output at least one first external control signal to tune and to select a corresponding diffused light color temperature performance; and
 a controller, electrically coupled with the first semiconductor switching device, the second semiconductor switching device and at least the first external control device;
 wherein when the light-emitting unit is in a turned on state, the controller outputs a first control signal to control a first conduction rate of the first semiconductor switching device and a second control signal to control the second conduction rate of the second semiconductor switching device to respectively deliver a first electric power to the first LED load and a second electric power to the second LED load to generate the diffused light with the diffused light color temperature thru the diffuser according to the at least one first external control signal;
 wherein for tuning the diffused light color temperature to a lower diffused light color temperature, the controller upon receiving the at least one first external control signal operates to increase the first conduction rate of the first semiconductor switching device to increase the first electric power delivered to the first LED load and simultaneously operates to decrease the second conduction rate of the second semiconductor switching device to decrease the second electric power delivered to the second LED load with the same pace such that a total diffused light intensity generated by the light-emitting unit remains essentially unchanged while the diffused light color temperature is accordingly adjusted to the lower diffused light color temperature;

wherein for tuning the diffused light color temperature to a higher diffused light color temperature, the controller upon receiving the at least one first external control signal operates to decrease the first conduction rate of the first semiconductor switching device to decrease the first electric power delivered to the first LED load and simultaneously operates to increase the second conduction rate of the second semiconductor switching device to increase the second electric power delivered to the second LED load with the same pace such that the total light intensity generated by the light-emitting unit remains essentially unchanged while the diffused light color temperature is accordingly adjusted to the higher diffused light color temperature;

wherein the first LED load and the second LED load are respectively designed with a configuration of in series and/or in parallel connections such that when incorporated with a power level setting of the at least one DC power an electric current passing through each LED of the first LED load and each LED of the second LED load remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across the LED to avoid a thermal damage or burning out of LED construction.

57. The LED lighting device configured with a tunable diffused light color temperature according to claim 56, wherein the at least one power source is an AC power source.

58. The LED lighting device configured with a tunable diffused light color temperature according to claim 56, wherein the light-emitting unit is turned on by a power switch.

59. The LED lighting device configured with a tunable diffused light color temperature according to claim 56, wherein the at least one power source is a DC power source, wherein the switching circuitry comprises a constant current circuitry outputting a constant current power.

60. The LED lighting device configured with a tunable diffused light color temperature according to claim 56, wherein the light-emitting unit is turned on by a photo sensor and/or a motion sensor.

61. The LED lighting device configured with a tunable diffused light color temperature according to claim 56, wherein the light-emitting unit is turned on by a wireless external control signal received from a wireless remote control device, a smart phone or a smart speaker.

62. The LED lighting device configured with a tunable diffused light color temperature according to claim 56, wherein the controller is designed with a diffused light color temperature switching scheme comprising a plurality of different diffused light color temperature performances to be respectively activated by the at least one first external control signal generated by the first external control device, wherein different paired combinations of the first conduction rate and the second conduction rate respectively for controlling the first electric power delivered to the first LED load and the second electric power delivered to the second LED load for creating different diffused light color temperatures are preprogrammed and executed by the controller for operating a pick and play process according to the at least one first external control signal generated by the first external control device for selecting a corresponding diffused light color temperature performance in the diffused light color temperature switching scheme.

63. The LED lighting device configured with a tunable diffused light color temperature according to claim 62, wherein the at least one first external control signal is a short power interruption signal generated by operating a main power switch, a push button, a touch sensor or a wireless remote control device wherein a power interruption detection circuit is electrically coupled with the controller, wherein when the short power interruption signal is detected by the power interruption detection circuit, the controller operates to alternately perform the corresponding diffused light color temperature performance in the diffused light color temperature switching scheme according to a prearranged sequence.

64. The LED lighting device configured with a tunable diffused light color temperature according to claim 63, wherein when the main power switch is used for generating the short power interruption signal, the main power switch is turned off and turned back on within a predetermined time interval.

65. The LED lighting device configured with a tunable diffused light color temperature according to claim 63, wherein when the push button or the touch sensor is used, a signal detection circuitry is connected to the push button switch or the touch sensor, wherein when the push button or the touch sensor is operated, a voltage signal is transmitted to the signal detection circuitry to actuate a momentary power interruption and consequently the short power interruption signal is generated and detected by the power interruption detection circuit, the controller accordingly operates to alternately perform the corresponding diffused light color temperature performance in the diffused light color temperature switching scheme according to the prearranged sequence.

66. The LED lighting device configured with a tunable diffused light color temperature according to claim 62, wherein the first external control device is a voltage divider operated by a user to output a plurality of voltage signals interpretable by the controller for executing the pick and play process for respectively selecting and performing the corresponding diffused light color temperature performance in the diffused light color temperature switching scheme; wherein the voltage divider is configured to output the plurality of voltage signals respectively represented by a voltage value, wherein the controller operates to activate the diffused light color temperature switching scheme to generate a corresponding diffused light color temperature performance in the diffused light color temperature switching scheme according to the voltage value outputted by the voltage divider.

67. The LED lighting device configured with a tunable diffused light color temperature according to claim 66, wherein the voltage divider is operated with a configuration of a slide switch, a rotary switch, or a pull chain switch, designed with a plurality of switching positions operable by a user for selecting and performing the corresponding diffused light color temperature performance from the diffused light color temperature switching scheme.

68. The LED lighting device configured with a tunable diffused light color temperature according to claim 62, wherein the first external control device is a wireless remote control device comprising at least one wireless external signal receiver electrically coupled with the controller to receive at least one wireless external control signal and convert the at least one wireless external control signal into the at least one first external control signal interpretable by the controller for activating the pick and play process to select and perform the corresponding diffused light color temperature performance in the diffused light color temperature switching scheme.

69. The LED lighting device configured with a tunable diffused light color temperature according to claim 62, wherein the first external control device is an active infrared ray sensor for detecting an infrared light reflected from an object and converting the infrared light reflected from the object into the at least one first external control signal interpretable by the controller for executing the pick and play process for selecting and performing the corresponding diffused light color temperature performance from the diffused light color temperature switching scheme.

70. The LED lighting device configured with a tunable diffused light color temperature according to claim 62, wherein the diffused light color temperature switching scheme comprises at least a high diffused light color temperature performance and a low diffused light color temperature performance, wherein for performing the high diffused light color temperature performance the second semiconductor switching device is fully conducted and the first semiconductor switching device is completely cut off, wherein for performing the low diffused light color temperature performance the first semiconductor switching device is fully conducted and the second semiconductor switching device is completely cut off.

71. The LED lighting device configured with a tunable diffused light color temperature according to claim 62, wherein the light color temperature switching scheme comprises at least a high diffused light color temperature performance, at least a medium diffused light color temperature performance and at least a low diffused light color temperature performance; wherein for performing the high diffused light color temperature performance the second semiconductor switching device is fully conducted and the first semiconductor switching device is completely cut off, wherein for performing the medium diffused light color temperature the first semiconductor switching device and the second semiconductor switching device are partially and complementarily conducted such that the total light intensity generated by the light-emitting unit remains essentially unchanged, wherein for performing the low diffused light color temperature performance the first semiconductor switching device is fully conducted while the second semiconductor switching device is completely cut off.

72. The LED lighting device configured with a tunable diffused light color temperature according to claim 71, wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

73. The LED lighting device configured with a tunable diffused light color temperature according to claim 62, wherein the at least one external control device is a push button or a touch sensor, wherein when the push button or the touch sensor is operated the controller accordingly operates to activate the pick and play process to alternately perform one of the diffused light color temperatures in the diffused light color temperature switching scheme according to a prearranged sequence.

74. The LED lighting device configured with a tunable diffused light color temperature according to claim 62, wherein the at least one external control device is a selection switch electrically connectable to a plurality of switching positions with each switching position being electrically and respectively coupled with a control pin of the controller, wherein when the selection switch is connected to one of the plurality of switching positions a constant voltage signal is delivered to a corresponding control pin of the controller to activate the diffused light color temperature switching scheme for selecting the corresponding diffused light color temperature.

75. The LED lighting device configured with a tunable diffused light color temperature according to claim 56, wherein M is equal to N.

76. The LED lighting device configured with a tunable diffused light color temperature according to claim 56, wherein M is smaller than N.

77. The LED lighting device configured with a tunable diffused light color temperature according to claim 56, wherein the low color temperature is designed in a range between 2000 K and 3000 K, the high color temperature is designed in the range between 5000 K and 6500K.

78. The LED lighting device configured with a tunable diffused light color temperature according to claim 56, wherein the LED lighting device is an LED light bulb, an LED recessed light, an LED ceiling light, an LED pendant light, an LED wall light, an LED under cabinet light, a ceiling fan light kit, a portable LED lamp or any other LED lamp for indoor or outdoor application.

79. The LED lighting device configured with a tunable diffused light color temperature according to claim 56, wherein when each of the first LED load and the second LED load is configured with a plurality of LEDs electrically connected in series or sets of in parallel connected LEDs electrically connected in series, a working voltage across each of the first LED load and the second LED load is confined in a domain between a minimum voltage equal to the sum of the threshold voltages of all LEDs electrically connected in series or sets of in parallel connected LEDs electrically connected in series and a maximum voltage equal to the sum of the maximum operating voltages of all LEDs electrically connected in series or sets of in parallel connected LEDs electrically connected in series.

80. The LED lighting device configured with a tunable diffused light color temperature according to claim 79, wherein when the LED has the voltage V across each LED complying with an operating constraint of 2.5 volts<$V_{th}$<V<$V_{max}$<3.5 volts, the first LED load and the second LED load are required to operate with respective working voltages $V_N$ and $V_M$ confined in domains expressed by $N_S \times 2.5$ volts<$V_N$<$N_S \times 3.5$ volts and $M_S \times 2.5$ volts<$V_M$<$M_S \times 3.5$ volts, with $N_S$ and $M_S$ respectively denoting the numbers of series connected LEDs in the first LED load and the second LED load, wherein $N_S \leq N$ and $M_S \leq M$.

81. An LED lighting device comprising:
a light-emitting unit comprising a plurality of LEDs divided into two LED loads connected in parallel, including a first LED load with N number of LEDs emitting light with a low light color temperature and a second LED load with M number of LEDs emitting light with a high light color temperature, wherein M and N are positive integers;
a light diffuser covering the first LED load and the second LED load to create a diffused light with a diffused light color temperature;
an LED driver circuitry electrically coupled between a power source
and the light-emitting unit to output a DC power;
a loading and power control unit configured with at least a power loading circuitry electrically coupled between the LED driver circuitry and the light-emitting unit to operate a plurality of different power loading options for respectively distributing and loading the DC power between a first electric power delivered to the first LED load and a second electric power delivered to the second LED load, wherein each of the plurality of different power loading options is configured with a paired combination of the first electric power and the second electric power for generating the diffused light with the diffused light color temperature to form a diffused light color temperature switching scheme comprising a plurality of different diffused light color temperature performances for selection; and
an external control unit including at least a first external control device for activating the diffused light color temperature switching scheme and executing a power loading option for performing a corresponding diffused light color temperature performance;
wherein the N number LEDs of the first LED load and the M number LEDs of the second LED load are respectively designed with a configuration of in series and/or in parallel connections such that when incorporated with a power level setting of the DC power an electric current passing through each LED of the first LED load and each LED of the second LED load remains at an adequate level such that a voltage V across each LED complies with an operating constraint of $V_{th}<V<V_{max}$ featuring electrical characteristics of a LED, where $V_{th}$ is a threshold voltage required to trigger the LED to start emitting light and $V_{max}$ is a maximum operating voltage across the LED to avoid a thermal damage or burning out of LED construction.

82. The LED lighting device according to claim 81, wherein the low light color temperature is designed in a range between 2000 K and 3000 K, wherein the high light color temperature is designed in a range between 5000 K and 6500 K.

83. The LED lighting device according to claim 81, wherein the power loading circuitry comprises a controller, a first semiconductor switching device and a second semiconductor switching device; wherein the controller is electrically coupled with the first semiconductor switching device, the second semiconductor switching device and the first external control device; wherein the first semiconductor switching device is electrically connected in series between the LED driver circuitry and the first LED load and the second semiconductor switching device is electrically connected in series between the LED driver circuitry and the second LED load; wherein the first external control device outputs at least one first external control signal to activate the diffused light color temperature switching scheme;
wherein the controller outputs a first control signal to control a first conduction rate of the first semiconductor switching device and a second control signal to control a second conduction rate of the second semiconductor switching device to respectively deliver the first electric power to the first LED load and the second electric power to the second LED load; wherein the controller is designed to operate the plurality of different power loading options, wherein different paired combinations of the first conduction rate and the second conduction rate respectively for controlling the first electric power delivered to the first LED load and the second electric power delivered to the second LED load for creating different diffused light color temperatures are preprogrammed and addressable by the controller for operating a pick and play process according to the at least one first external control signal generated by the first external control device for selecting the corresponding diffused light color temperature performance in the diffused light color temperature switching scheme; wherein a total light intensity generated by the light-emitting unit remains essentially unchanged while the diffused light color temperature is alternately adjusted.

84. The LED lighting device according to claim 83, wherein the at least one first external control signal is a short power interruption signal generated by operating a main power switch, a push button, a touch sensor or a wireless remote control device, wherein a power interruption detection circuit is electrically coupled with the controller, wherein when the short power interruption signal is detected by the power interruption detection circuit, the controller operates to alternately perform the corresponding diffused light color temperature performance in the diffused light color temperature switching scheme according to a prearranged sequence.

85. The LED lighting device according to claim 84, wherein when the main power switch is used for generating the short power interruption signal, the main power switch is turned off and turned back on within a predetermined time interval.

86. The LED lighting device according to claim 84, wherein when the push button or the touch sensor is used, a signal detection circuitry is connected to the push button or the touch sensor, wherein when the push button or the touch sensor is operated, a voltage signal is transmitted to the signal detection circuitry to actuate a momentary power interruption and consequently a short power interruption signal is generated and detected by the power interruption detection circuit, the controller accordingly operates to alternately perform the corresponding diffused light color temperature performance in the diffused light color temperature switching scheme according to a prearranged sequence.

87. The LED lighting device according to claim 84, wherein the short power interruption signal is generated by a wireless external control signal designed to control a conduction state of a bi-directional semiconductor switching device electrically connected between an AC power source and an LED driver circuitry, wherein the wireless external control signal is received by a wireless signal receiver electrically coupled with a second controller electrically coupled with the bi-directional semiconductor switching device, wherein upon receiving the wireless external control signal the second controller operates to instantly cutoff a conduction of the bi-directional semiconductor switching device and re-conduct the bi-directional semiconductor switching device within a predetermined time interval, wherein the LED driver circuitry comprises an AC/DC power converter and a constant current control circuit to output a constant current to the power loading circuitry.

88. The LED lighting device according to claim 84, wherein the short power interruption signal is generated by a push button or a touch sensor electrically coupled with a second controller electrically coupled with a bi-directional semiconductor switching device to control a conduction state of the bi-directional semiconductor switching device electrically connected between an AC power source and an LED driver circuitry, wherein when the push button or the touch sensor is operated for a short time interval, a voltage signal with a time length equal to the short time interval is detected by the second controller, wherein upon receiving the voltage signal the second controller operates to instantly cutoff a conduction of the bi-directional semiconductor switching device and re-conduct the bi-directional semiconductor switching device within the short time interval to generate the short power interruption signal, wherein the LED driver circuitry comprises an AC/DC power converter and a constant current control circuit to output a constant current to the power loading circuitry.

89. The LED lighting device according to claim 83, wherein the first external control device is a voltage divider operated by a user to output a plurality of voltage signals interpretable by the controller for respectively executing the pick and play process for respectively selecting and performing the corresponding diffused light color temperature performance in the diffused light color temperature switching scheme; wherein the voltage divider is configured to output the plurality of voltage signals respectively represented by a voltage value, wherein the controller operates to activate the diffused light color temperature switching scheme to generate a corresponding diffused light color temperature performance in the diffused light color temperature switching scheme according to the voltage value outputted by the voltage divider.

90. The LED lighting device according to claim 89, wherein the voltage divider is optionally designed with a stepless/free setting switch; wherein the voltage divider is configured to operate with a variable resistor to output a voltage value corresponding to a final parking location of a switching motion at the variable resistor; wherein a full voltage value of the voltage divider corresponding to a full length of the variable resistor is divided into a plurality of different voltage domains for activating the pick and play process, wherein the stepless/free setting switch is allowed to park at any location on the variable resistor to generate a corresponding voltage value to the controller, wherein the controller is designed to operate the pick and play process according to a belonging of a voltage domain with respect to the corresponding voltage value received from the voltage divider for selecting the diffused light color temperature performance corresponding to the voltage domain.

91. The LED lighting device according to claim 89, wherein the voltage divider is operated with a configuration of a slide switch, a rotary switch, or a pull chain switch, designed with a plurality of switching positions operable by a user for selecting and performing the corresponding diffused light color temperature performance from the diffused light color temperature switching scheme.

92. The LED lighting device according to claim 83, wherein the first external control device is a wireless remote control device comprising at least one wireless external signal receiver electrically coupled with the controller to receive at least one wireless external control signal and convert the at least one wireless external control signal into the at least one first external control signal interpretable by the controller for activating the pick and play process to select and perform the corresponding diffused light color temperature performance in the diffused light color temperature switching scheme.

93. The LED lighting device according to claim 83, wherein the first external control device is an active infrared ray sensor for detecting an infrared light reflected from an object and converting the infrared light reflected from the object into the at least one first external control signal interpretable by the controller for executing the pick and play process for selecting and performing the corresponding diffused light color temperature performance from the diffused light color temperature switching scheme.

94. The LED lighting device according to claim 83, wherein the at least one external control device is a push button or a touch sensor, wherein when the push button or the touch sensor is operated, the controller accordingly operates to activate the pick and play process to alternately perform one of the diffused light color temperature performances in the diffused light color temperature switching scheme according to a prearranged sequence.

95. The LED lighting device according to claim 83, wherein the at least one external control device is a selection switch electrically connectable to a plurality of switching positions with each switching position being electrically and respectively coupled with a control pin of the controller, wherein when the selection switch is connected to one of the plurality of switching positions, a constant voltage signal is delivered to a corresponding control pin of the controller to activate the diffused light color temperature switching scheme for selecting the corresponding diffused light color temperature performance.

96. The LED lighting device according to claim 83, wherein the LED lighting device is an LED light bulb, an LED recessed light, an LED ceiling light, an LED pendant light, an LED wall light, an LED under cabinet light, a ceiling fan light kit, a portable LED lamp or any other LED lamp for indoor or outdoor application.

97. The LED lighting device according to claim 83, wherein the diffused light color temperature performances of the diffused light color temperature switching scheme include a low diffused light color temperature performance, a medium diffused light color temperature performance and a high diffused light color temperature performance; wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the medium diffused light color temperature performance for the predetermined short time interval, and then is switched to perform the high diffused light color temperature performance for the predetermined short time interval to complete a free running cycle, the free running cycle continues till the second external control signal is ceased or till the second external control device outputs another second external control signal to end the free running process.

98. The LED lighting device according to claim 83, wherein the diffused light color temperature performances of the diffused light color temperature switching scheme include a low diffused light color temperature performance, a low-medium diffused light color temperature performance, a medium diffused light color temperature performance, a high-medium diffused light color temperature performance and a high diffused light color temperature performance; wherein the controller is further designed with a free running process to operate a free running performance of the diffused light color temperature switching scheme, wherein a second external control device is designed to output a second external control signal to activate the free running process, wherein the controller manages to operate the free running process to gradually rotate a running pick and play of the diffused light color temperature switching scheme, wherein the free running process operates to perform the low diffused light color temperature performance first for a predetermined short time interval, and then is switched to perform the low-medium diffused light color temperature performance for the predetermined short time interval, and then is switched to perform the medium diffused light color temperature performance for the predetermined short time interval, and then is switched to perform the high-medium diffused light color temperature performance for the predetermined short time interval, and then is switched to perform the high diffused light color temperature performance to complete a free running cycle, the free running cycle continues till the second external control signal is ceased or till the second external control device outputs another second external control signal to end the free running process.

99. The LED lighting device according to claim 81, wherein the first external control device comprises a selection switch respectively connectable to two switching positions configured in the power loading circuitry including a first switching position electrically connected to the first LED load and a second switching position electrically connected to the second LED load, wherein the power loading circuitry is designed with two power loading options including a first power loading option and a second power loading option, wherein when the selection switch is electrically connected to the first switching position, the first power loading option is activated with the DC power being delivered only to the first LED load, namely the first electric power is equal to the DC power, to generate the diffused light with a low diffused light color temperature, and wherein when the selection switch is electrically connected to the second switching position, the second power loading option is activated with the DC power being delivered only to the second LED load, namely the second electric power is equal to the DC power, to generate the diffused light with a high diffused light color temperature.

100. The LED lighting device according to claim 81, wherein the LED driver circuitry outputs the DC power with a constant current to the light-emitting unit; wherein the first external control device comprises a selection switch connectable respectively to three switching positions configured in the power loading circuitry including a first switching position electrically connected to only the first LED load, a second switching position electrically connected to both the first LED load and the second LED load, and a third switching position electrically connected to only the second LED load; wherein the power loading circuitry comprises three power loading options including a first power loading option, a second power loading option and a third power loading option; wherein when the selection switch is electrically connected to the first switching position, the first power loading option is activated with the DC power being delivered only to the first LED load, namely the first electric power is equal to the DC power, to generate the diffused light with a low diffused light color temperature; wherein when the selection switch is electrically connected to the second switching position, the second power loading option is activated with the DC power being delivered to both the first LED load and the second LED load to generate the diffused light with a medium diffused light color temperature; wherein when the selection switch is electrically connected to the third switching position, the third power loading option is activated with the DC power being delivered only to the second LED load, namely the second electric power is equal to the DC power, to generate the diffused light with a high diffused light color temperature.

101. The LED lighting device according to claim 81, wherein the LED driver circuitry outputs the DC power with a constant current to the light-emitting unit; wherein the first external control device comprises a selection switch connectable respectively to five switching positions configured in the power loading circuitry including a first switching position electrically connected to only the first LED load, a second switching position electrically connected to both the first LED load and the second LED load with a second resistor being connected in series with the second LED load, a third switching position electrically connected to both the first LED load and the second LED load, a fourth switching position electrically connected with both the first LED load and the second LED load with a first resistor being connected in series with the first LED load, and a fifth switching position electrically connected to only the second LED load, wherein the power loading circuitry comprises five power loading options including a first power loading option, a second power loading option, a third power loading option, a fourth power loading option and a fifth power loading option; wherein when the selection switch is electrically connected to the first switching position, the first power loading option is activated with the DC power being delivered only to the first LED load with the first electric power being equal to the DC power to generate the diffused light with a low diffused light color temperature; wherein when the selection switch is electrically connected to the second switching position, the second power loading option is activated with the DC power being delivered to both the first LED load and the second LED load with the first electric power delivered to the first LED load being greater than the second electric power delivered to the second LED load to generate the diffused light with a low-medium diffused light color temperature; wherein when the selection switch is electrically connected to the third switching position, the third power loading option is activated with the DC power being distributed to both the first LED load and the second LED load with the first electric power being essentially equal to the second electric power to generate the diffused light with a medium diffused light color temperature; wherein when the selection switch is electrically connected to the fourth switching position, the fourth power loading option is activated with the DC power being distributed between the first LED load and the second LED load with the second electric power delivered to the second LED load being greater than the first electric power delivered to the first LED load to generate the diffused light with a high-medium diffused light color temperature, and when the selection switch is electrically connected to the fifth switching position, the fifth power loading option is activated with the DC power being delivered to only the second LED load with the second electric power being equal to the DC power to generate the diffused light with a high diffused light color temperature.

* * * * *

UNITED STATES PATENT AND TRADEMARK OFFICE
CERTIFICATE OF CORRECTION

PATENT NO. : 10,770,916 B2
APPLICATION NO. : 16/668599
DATED : September 8, 2020
INVENTOR(S) : Chia-Teh Chen Page 1 of 1

It is certified that error appears in the above-identified patent and that said Letters Patent is hereby corrected as shown below:

In the Specification

1. Column 8, Line 27:
Please delete the term "of 2700K" and insert --in a range between 2000K and 3000K--.

2. Column 8, Line 28:
Please delete the term "of 5000K" and insert --in a range between 5000K and 6500K--.

3. Column 11, Line 35:
Please delete the term "of 5000K" and insert --in a range between 5000K and 6500K--.

4. Column 11, Line 37:
Please delete the term "of 2700K" and insert --in a range between 2000K and 3000K--.

Signed and Sealed this
Twenty-fifth Day of January, 2022

Drew Hirshfeld
*Performing the Functions and Duties of the*
*Under Secretary of Commerce for Intellectual Property and*
*Director of the United States Patent and Trademark Office*